United States Patent
Jung et al.

(10) Patent No.: US 10,694,478 B2
(45) Date of Patent: Jun. 23, 2020

(54) METHOD FOR RECEIVING SSB ACCORDING TO SYNCHRONIZATION RASTER AND USER EQUIPMENT

(71) Applicant: LG ELECTRONICS INC., Seoul (KR)

(72) Inventors: Manyoung Jung, Seoul (KR); Hyunsoo Ko, Seoul (KR); Yoonoh Yang, Seoul (KR); Sangwook Lee, Seoul (KR); Suhwan Lim, Seoul (KR); Jinyup Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/250,988

(22) Filed: Jan. 17, 2019

(65) Prior Publication Data

US 2019/0159148 A1    May 23, 2019

Related U.S. Application Data

(63) Continuation of application No. PCT/KR2018/009777, filed on Aug. 24, 2018.

(60) Provisional application No. 62/591,783, filed on Nov. 29, 2017, provisional application No. 62/586,914, filed on Nov. 16, 2017, provisional application No. 62/566,541, filed on Oct. 2, 2017, provisional application No. 62/557,023, filed on Sep. 11, 2017.

(51) Int. Cl.
*H04W 56/00* (2009.01)
*H04J 11/00* (2006.01)

(52) U.S. Cl.
CPC ..... *H04W 56/0005* (2013.01); *H04J 11/0069* (2013.01); *H04W 56/006* (2013.01); *H04J 11/0073* (2013.01); *H04J 11/0076* (2013.01); *H04J 2011/0096* (2013.01); *H04J 2211/005* (2013.01)

(58) Field of Classification Search
None
See application file for complete search history.

(56) References Cited

U.S. PATENT DOCUMENTS

| | | | |
|---|---|---|---|
| 2002/0140868 A1* | 10/2002 | Yamagata | H04N 5/4401 348/725 |
| 2015/0333881 A1* | 11/2015 | Shang | H04W 72/0453 370/328 |
| 2016/0360530 A1 | 12/2016 | Leyh et al. | |
| 2017/0006458 A1 | 1/2017 | Wang et al. | |
| 2017/0094621 A1 | 3/2017 | Xu et al. | |
| 2017/0094624 A1 | 3/2017 | Balachandran et al. | |

(Continued)

OTHER PUBLICATIONS

Kowalewski et al., "5G Frame Structure," Nomor Research Gmbh, Aug. 2017, 7 pages.

(Continued)

*Primary Examiner* — Xavier S Wong
(74) *Attorney, Agent, or Firm* — Fish & Richardson P.C.

(57) ABSTRACT

One disclosure of this specification provides a method for receiving a synchronization signal block (SSB) by a user equipment (UE). The method may include: determining frequency locations of multiple SSBs; and receiving at least one SSB among the multiple SSBs. The multiple SSBs may be configured to be arranged spaced apart from each other by a predetermined offset. The at least one SSB may be located at an interval of 1.2 MHz on a frequency axis.

15 Claims, 14 Drawing Sheets

(56) References Cited

U.S. PATENT DOCUMENTS

| | | | |
|---|---|---|---|
| 2018/0103445 A1* | 4/2018 | Akkarakaran | H04J 3/06 |
| 2018/0337755 A1* | 11/2018 | John Wilson | H04L 27/2675 |
| 2019/0059011 A1* | 2/2019 | Astrom | H04B 17/318 |
| 2019/0082402 A1* | 3/2019 | Ly | H04J 11/0073 |

OTHER PUBLICATIONS

Qualcomm Incorporated, "Synchronization signal bandwidth and multiplexing consideration," R1-1700784, 3GPP TSG-RAN WG1 NR AdHoc, Spokane, USA, Jan. 16-20, 2017, 8 pages.
ITL, "Multiple SS block indication in wideband CC", R1-1711352, 3GPP TSG RAN WG1 NR Ad-Hoc#2, Qingdao, P.R. China, Jun. 27-30, 2017, 5 pages.
Ericsson, "NR Sync and Channel raster concept in Range 1," R4-1707743, 3GPP TSG-RAN WG4 meeting #84, Berlin, Germany, Aug. 21-25, 2017, 4 pages.
"RAN4#83 Meeting report," 3GPP TSG-RAN WG4 Meeting #84, Berlin, Germany, dated Aug. 21-25, 2017, 156 pages, XP051276713.
Extended European Search Report in European Application No. 18830129.5, dated Mar. 11, 2020, 10 pages.
Huawei, HiSilicon, "On synchronization signal raster and subcarrier spacing," R4-1705292, 3GPP TSG-RAN WG4 Meeting #83, Hangzhou, China, dated May 14-20, 2017, 6 pages.

* cited by examiner

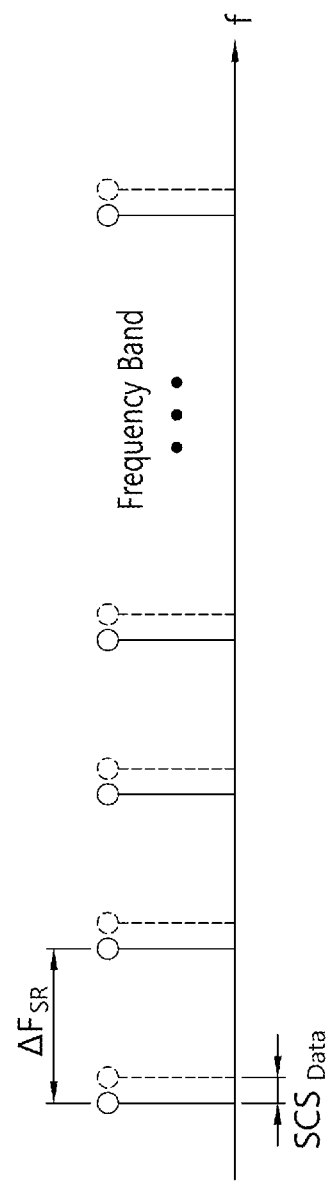

METHOD FOR RECEIVING SSB ACCORDING TO SYNCHRONIZATION RASTER AND USER EQUIPMENT

CROSS-REFERENCE TO RELATED APPLICATIONS

Pursuant to 35 U.S.C. § 119(e), this application is a continuation of International Application PCT/KR2018/009777, with an international filing date of Aug. 24, 2018, which claims the benefit of U.S. Provisional Applications No. 62/557,023 filed on Sep. 11, 2017, No. 62/566,541 filed on Oct. 2, 2017, No. 62/586,914 filed on Nov. 16, 2017, and No. 62/591,783 filed on Nov. 29, 2017, the contents of which are all hereby incorporated by reference herein in their entirety.

BACKGROUND OF THE INVENTION

Field of the Invention

The present invention relates to mobile communication.

Related Art

Thanks to the success of long term evolution (LTE)/LTE-advanced (LTE-A) for 4G mobile communication, interest in the next generation, i.e., 5-generation (so called 5G) mobile communication has been increased and researches have been continuously conducted.

In 5G NR, a physical broadcast channel (PBCH) including information required for a UE to perform an initial access, that is, an MIB and a synchronization signal SS (including PSS and SSS) are defined as an SS block. In addition, a plurality of SS blocks are bound to be defined as an SS burst, and a plurality of SS bursts are bound to be defined as an SS burst set. Each SS block is assumed to be beamformed in a specific direction, and several SS blocks in the SS burst set are designed to support UEs in different directions.

Meanwhile, the channel raster represents a subset of RF reference frequencies that may be used to identify RF channel locations in the uplink and downlink. On the other hand, the synchronization raster represents the frequency location of the SS block used to obtain system information by the UE.

In an existing LTE/LTE-A, since a synchronization signal has been located at the center of a channel bandwidth (CBW), a synchronization raster and a channel raster are equally handled.

However, in NR, the SS block is not at the center of the channel bandwidth (CBW). Therefore, in order for NR UE to efficiently receive the SS block, it is necessary to define the synchronization raster and improve the operation of the UE.

SUMMARY OF THE INVENTION

Accordingly, a disclosure of the present specification has been made in an effort to solve the aforementioned problem.

Accordingly, in an effort to solve the aforementioned problem, a disclosure of the present specification provides a method for receiving a synchronization signal block (SSB). The method may be performed by a user equipment (UE) and comprise: determining frequency positions of plural SSBs; and receiving, from a cell, at least one SSB among the plural SSBs. The plural SSBs may be configured to be distanced from each other with a predetermined offset. The at least one SSB may be positioned per an interval of 1.2 MHz in a frequency axis.

The plural SSBs may include at least three SSBs.

The predetermined offset may be 100 kHz.

The at least one SSB may not be located in a center frequency of a cell.

The frequency positions may be defined by a synchronization raster.

The synchronization raster may be different from a channel raster.

The at least one SSB may include a primary synchronization signal (PSS), a secondary synchronization signal (SSS) and a physical broadcast channel (PBCH).

Accordingly, in an effort to solve the aforementioned problem, a disclosure of the present specification also provides a user equipment (UE) for receiving a synchronization signal block (SSB). The UE may comprise: a transceiver; and a processor configured to control the transceiver. The processor may be configured to determine frequency positions of plural SSBs and then receive, from a cell, at least one SSB among the plural SSBs. The plural SSBs may be configured to be distanced from each other with a predetermined offset. The at least one SSB is positioned per an interval of 1.2 MHz in a frequency axis.

According to the disclosure of the present invention, the problem of the conventional technology described above may be solved.

BRIEF DESCRIPTION OF THE DRAWINGS

FIG. 8A illustrates an example of a synchronization raster according to Option 3 of Section III-3.

DESCRIPTION OF EXEMPLARY EMBODIMENTS

Figure 1:
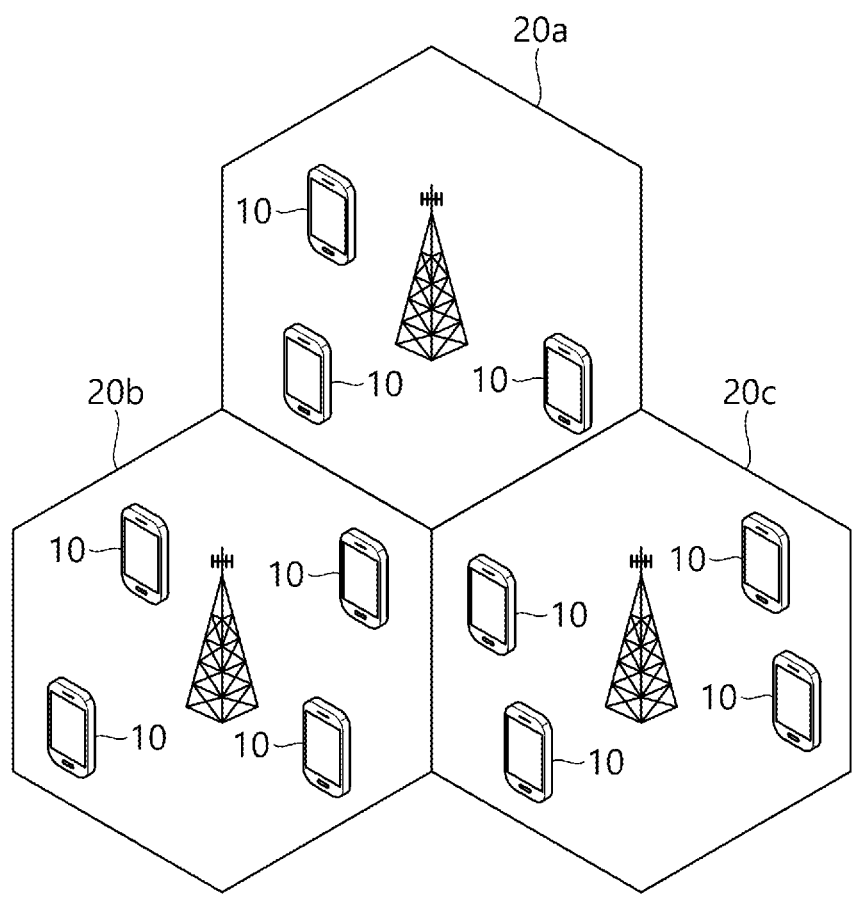
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UEl 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
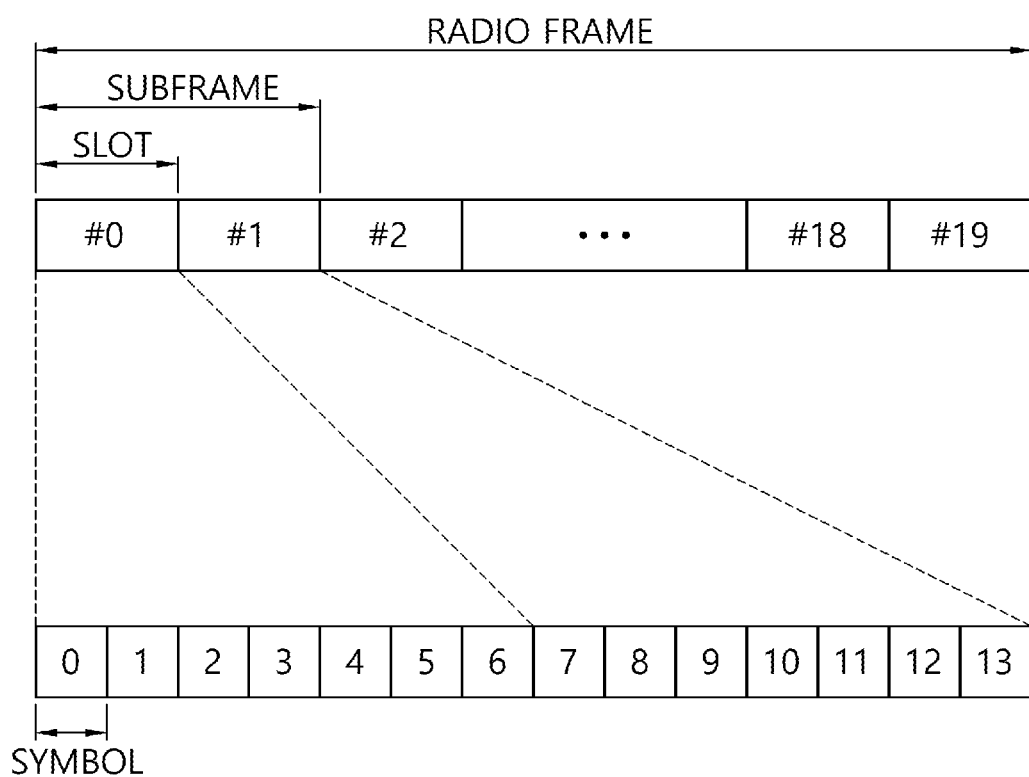
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes $N_{RB}$ resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

<Measurement and Measurement Report>

In the mobile communication system, mobility support of the UE 100 is required. Accordingly, the UE 100 continuously measures a quality of a serving cell providing a current service and the quality of a neighboring cell. The UE 100 reports a measurement result to the network at an appropriate time and the network provides optimum mobility to the UE through handover or the like. Often, measurement of such a purpose is referred to as radio resource management (RRM).

Meanwhile, the UE 100 monitors a downlink quality of a primary cell (Pcell) based on a CRS. This is referred to as radio link monitoring (RLM).

Figure 3:
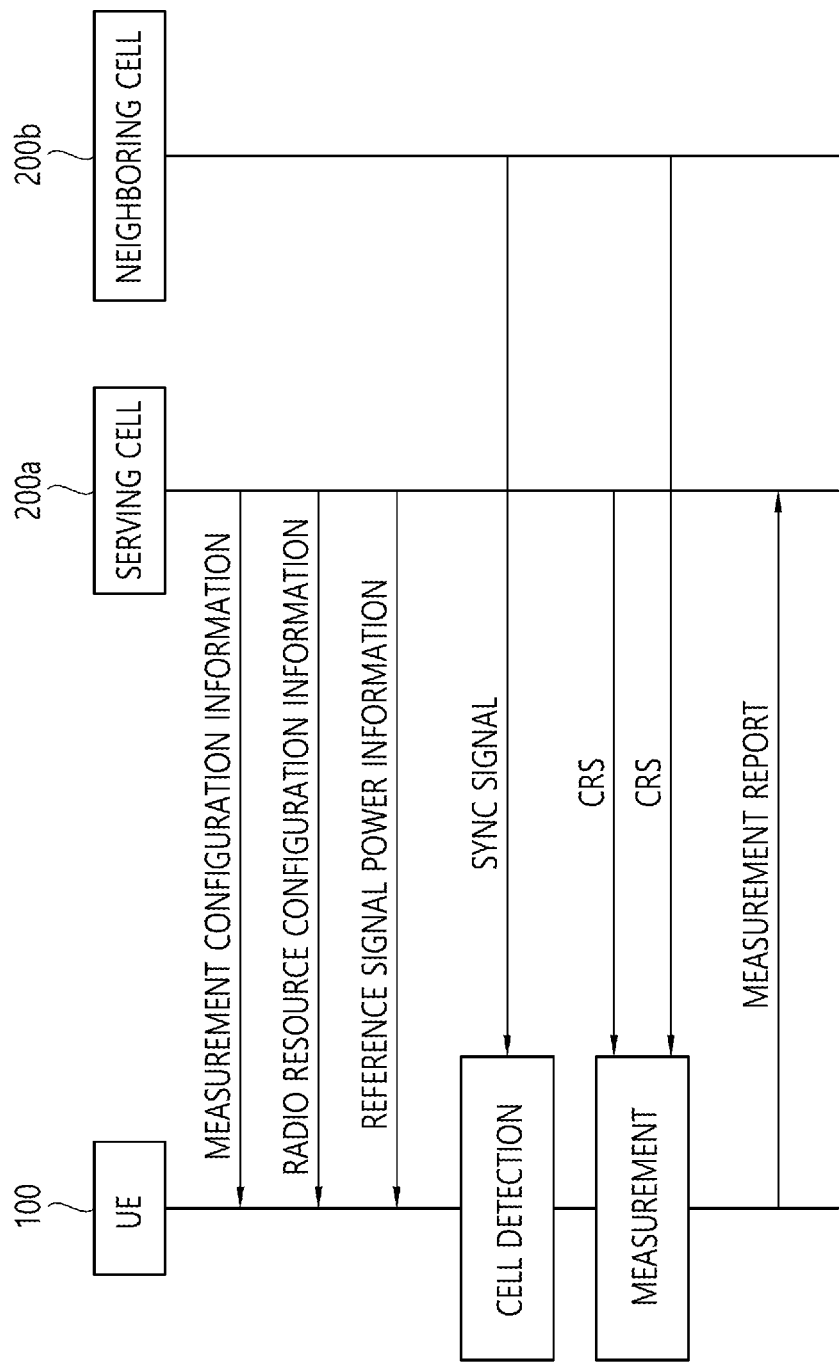
FIG. 3 illustrates a cell detection and measurement procedure.

FIG. 3 illustrates a cell detection and measurement procedure.

As can be seen with reference to from FIG. 3, the UE detects the neighboring cell based on a synchronization signal (SS) transmitted from the neighboring cell. The SS may include a primary synchronization signal (PSS) and a secondary synchronization signal (SSS).

In addition, when each of the serving cell 200a and the neighboring cell 200b transmits a cell-specific reference signal (CRS) to the UE 100, the UE 100 performs measure through the CRS and transmits a measurement result thereof to the serving cell 200a. In this case, the UE 100 compares power of the received CRS based on information on received reference signal power.

In this case, the UE 100 may perform the measurement by three following methods.

1) Reference signal received power (RSRP): represents average received power of all REs that carry the CRS transmitted over the entire band. In this case, the average received power of all REs that carry a channel state information (CSI)-reference signal (RS) instead of the CRS.

2) Received signal strength indicator (RSSI): represents received power measured in the entire band. The RSSI includes all of the signal, interference, and thermal noise.

3) Reference symbol received quality (RSRQ): represents the CQI and may be determined as the RSRP/RSSI depending on a measurement bandwidth or subband. That is, the RSRQ refers to a signal-to-noise interference ratio (SINR). Since the RSRP does not provide sufficient mobility information, the RSRQ may be used instead of the RSRP in the process of handover or cell reselection.

The RSRQ may be calculated as RSSI/RSSP.

Meanwhile, as shown in FIG. 3, the UE 100 receives a radio resource configuration information element (IE) from the serving cell 100a for the measurement. The radio resource configuration dedicated information element (IE) is used for configuring/modifying/canceling a radio bearer, or modifying a MAC configuration, and the like. The radio resource configuration IE includes subframe pattern information. The subframe pattern information is information on a measurement resource restriction pattern on the time domain for measuring RSRP and RSRQ for a serving cell (e.g., a primary cell).

Meanwhile, the UE 100 receives a measurement configuration (hereinafter also referred to as "measconfig") information element (IE) from the serving cell 100a for the measurement. A message including the measurement configuration information element (IE) is referred to as a measurement configuration message. Here, the measurement configuration information element (IE) may be received through an RRC connection reconfiguration message. When a measurement result satisfies a reporting condition in the measurement configuration information, the UE reports the measurement result to the base station. A message including the measurement result is referred to as a measurement report message.

The measurement configuration IE may include measurement object information. The measurement object information is information about an object to be measured by the UE. The measurement object includes at least any one of an intra-frequency measurement object which is an intra-cell measurement object, an inter-frequency measurement object which is an inter-cell measurement object, and an inter-RAT measurement object which is an inter-RAT measurement object. For example, the intra-frequency measurement object may indicate a neighbor cell having the same frequency band as a serving cell, the inter-frequency measurement object may indicate a neighbor cell having a different frequency band from the serving cell, and the inter-RAT measurement object may indicate a neighbor cell of am RAT different from the RAT of the serving cell.

TABLE 1

Description of measurement object field carrierFreq
This indicates an E-UTRA carrier frequency to which this configuration applies.
measCycleSCell
This indicates a cycle for measuring SCell in a deactivated state. The value may be set to 160, 256, and the like. When the value is 160, measurement is performed every 160 subframes.

Meanwhile, the measurement configuration IE includes an information element (IE) as shown in Table below.

TABLE 2

Description of MeasConfig field allowInterruptions
When the value is True, this indicates that when the UE performs measurements using MeasCycleScell for carriers of the deactivated Scell, it is allowed to stop sending and receiving with the serving cell.
measGapConfig
Configure or release a measurement gap.

The measGapConfig is used to configure or release a measurement gap (MG). The measurement gap MG is a period for performing cell identification and RSRP measurement on an inter frequency different from the serving cell.

TABLE 3

Description of MeasConfig field gapOffset
The value of gapOffset may be set to either gp0 or gp1. gp0 corresponds to a gap offset of a pattern ID "0" having MGRP = 40 ms. Gp1 corresponds to a gap offset of a pattern ID "1" having MGRP = 40 ms.

TABLE 4

| Gap pattern Id | Measurement Gap Length (MGL) | Measurement Gap Repetition Period (MGRP) | Minimum time to perform measurement for inter-frequency and inter-RAT during period of 480 ms |
|---|---|---|---|
| 0 | 6 ms | 40 ms | 60 ms |
| 1 | 6 ms | 80 ms | 30 ms |

If the UE requires a measurement gap to identify and measure inter-frequency and inter-RAT cells, the E-UTRAN (i.e., the base station) provides one measurement gap (MG) having a constant gap period. The UE does not transmit or receive any data from the serving cell during the measurement gap period, retunes its RF chain to the inter-frequency, and then performs the measurement at the corresponding inter-frequency.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Internet of Things (IoT) Communication>

Meanwhile, hereinafter, IoT will be described.

IoT refers to information exchange through the base station between IoT devices without accompanying human interaction and information exchange through the base station between an IoT device and a server. As such, IoT communication communicates via cellular base stations and thus is also referred to as cellular Internet of Things (CIoT).

Such IoT communication is a kind of machine type communication (MTC). Therefore, the IoT device may be referred to as an MTC device.

Since the IoT communication has features that a transmission data amount is small and uplink or downlink data transmission and reception rarely occur, it is preferable to lower the cost of the IoT device and reduce battery consumption in accordance with a low data transmission rate. In addition, since the IoT device has a feature of low mobility, the channel environment is not almost changed.

As one method for low-cost IoT devices, regardless of a system bandwidth of the cell, the IoT device may use a sub-band of, for example, approximately 1.4 MHz.

As such, IoT communication operating on such a reduced bandwidth may be called narrow band (NB) IoT communication or NB CIoT communication.

<Next-Generation Mobile Communication Network>

Thanks to the success of long term evolution (LTE)/LTE-advanced (LTE-A) for 4G mobile communication, interest in the next generation, that is, 5-generation (so called 5G) mobile communication has been increased and researches have been continuously conducted.

The 5G mobile telecommunications defined by the International Telecommunication Union (ITU) refers to providing a data transmission rate of up to 20 Gbps and a feel transmission rate of at least 100 Mbps or more at any location. The official name is 'IMT-2020' and its goal is to be commercialized worldwide in 2020.

ITU proposes three usage scenarios, for example, enhanced mobile broadband (eMBB) and massive machine type communication (mMTC) and ultra reliable and low latency communications (URLLC).

The URLLC relates to a usage scenario that requires high reliability and a low latency time. For example, services such as autonomous navigation, factory automation, and augmented reality require high reliability and low latency (e.g., a latency time of 1 ms or less). Currently, the latency time of 4G (LTE) is statistically 21 to 43 ms (best 10%) and 33 to 75 ms (median). This is insufficient to support a service requiring the latency time of 1 ms or less. Next, the eMBB usage scenario relates to a usage scenario requiring a mobile ultra-wideband.

That is, the 5G mobile communication system aims at higher capacity than the current 4G LTE, and may increase the density of mobile broadband users and support device to device (D2D), high stability, and machine type communication (MTC). 5G research and development also aims at a lower latency time and lower battery consumption than a 4G mobile communication system to better implement the Internet of things. A new radio access technology (new RAT or NR) may be proposed for such 5G mobile communication.

In the NR, it may be considered that the reception from the base station uses a downlink subframe and the transmission to the base station uses an uplink subframe. This method may be applied to paired spectra and unpaired spectra. A pair of spectra means that two carrier spectra are included for downlink and uplink operations. For example, in a pair of spectra, one carrier may include a downlink band and an uplink band that are paired with each other.

Figure 4:
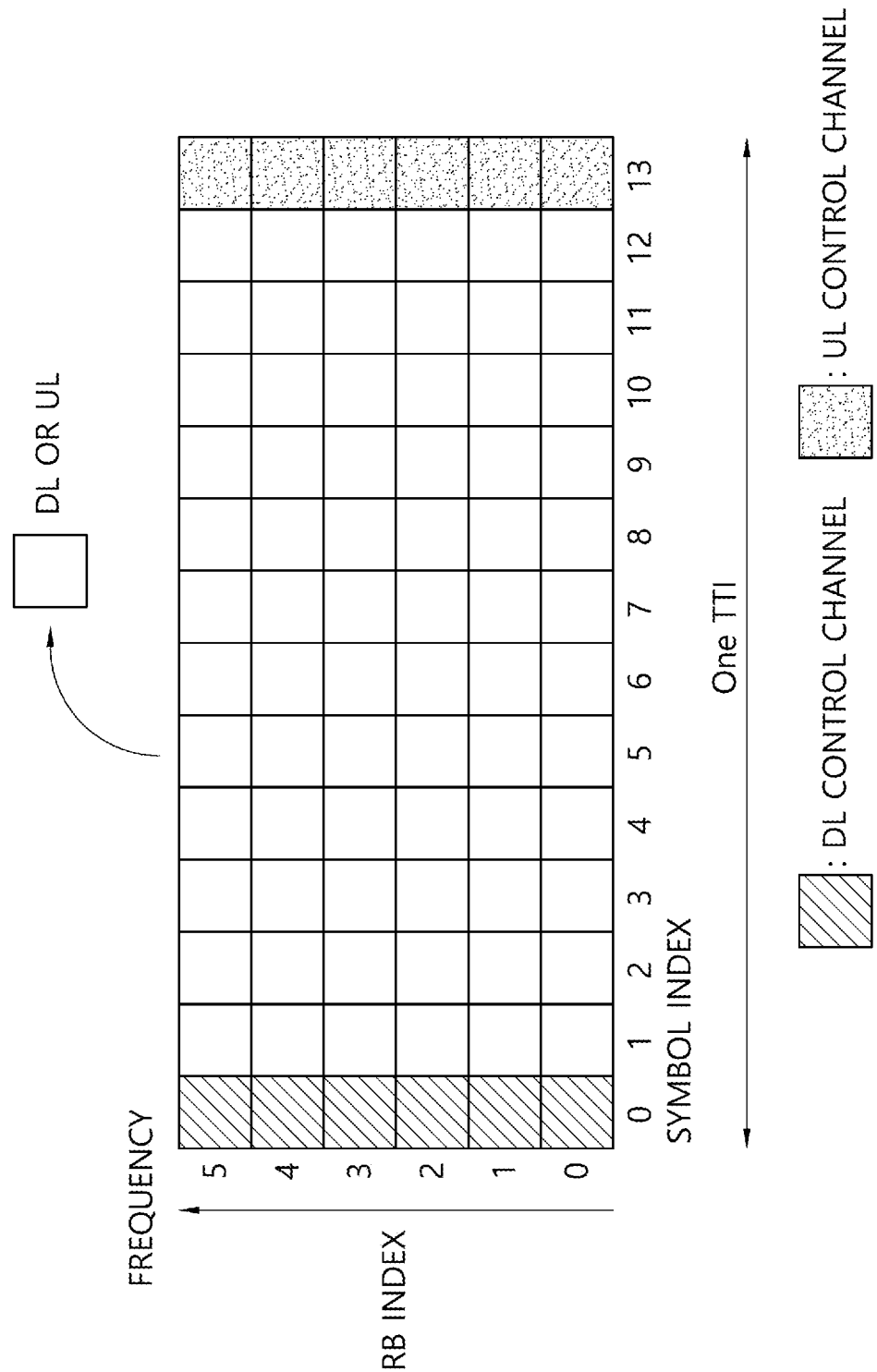
FIG. 4 illustrates an example of a subframe type in NR.

FIG. 4 illustrates an Example of a Subframe Type in NR.

A transmission time interval (TTI) illustrated in FIG. 4 may be referred to as a subframe or slot for NR (or new RAT). The subframe (or slot) of FIG. 4 may be used in a TDD system of the NR (or new RAT) to minimize the data transmission delay. As illustrated in FIG. 4, a subframe (or slot) includes 14 symbols, like the current subframe. The front symbol of the subframe (or slot) may be used for a DL control channel and the rear symbol of the subframe (or slot) may be used for a UL control channel. The remaining symbols may be used for DL data transmission or UL data transmission. According to such a subframe (or slot) structure, downlink transmission and uplink transmission may be sequentially performed in one subframe (or slot). Accordingly, downlink data may be received within the subframe (or slot) and an uplink acknowledgment response (ACK/NACK) may be transmitted within the subframe (or slot). The structure of such a subframe (or slot) may be referred to as a self-contained subframe (or slot). The use of such a sub-frame (or slot) structure has an advantage that the time taken to retransmit the data where a receive error occurs is reduced and a latency time of the last data transmission may be minimized. In such a self-contained subframe (or slot) structure, a time gap may be required in a transition process from the transmission mode to the reception mode or from the reception mode to the transmission mode. To this end, some OFDM symbols at the time of switching from DL to UL in the subframe structure may be configured as a guard period (GP).

<Support of Various Numerologies>

In the next system, a number of numerologies may be provided to the UE with the development of a wireless communication technology.

The numerology may be defined by a cycle prefix (CP) length and a subcarrier spacing. One cell may provide a plurality of numerologies to the UE. When the index of the numerology is denoted by μ, each subcarrier spacing and corresponding CP length may be as shown in Table below.

TABLE 5

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when the index of the numerology is denoted by μ, the number $N^{slot}_{symb}$ of OFDM symbols per slot, the number $N^{frame,\mu}_{slot}$ of slots per frame, and the number $N^{subframe,\mu}_{slot}$ of slots per subframe are shown in Table below.

In the case of a normal CP, when the index of the numerology is denoted by μ, the number $N^{slot}_{symb}$ of OFDM symbols per slot, the number $N^{frame,\mu}_{slot}$ of slots per frame, and the number $N^{subframe,\mu}_{slot}$ of slots per subframe are shown in Table below.

TABLE 6

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when the index of the numerology is denoted by μ, the number $N^{slot}_{symb}$ of OFDM symbols per slot, the number $N^{frame,\mu}_{slot}$ of slots per frame, and the number $N^{subframe,\mu}_{slot}$ of slots per subframe are shown in Table below.

TABLE 7

| μ | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next-generation mobile communication, each symbol in a symbol may be used as a downlink or as an uplink as shown in Table below. In the following table, the uplink is denoted by U and the downlink is denoted by D. In Table below, X represents a symbol that may be used flexibly in the uplink or downlink.

TABLE 8

| Format | Symbol number in slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | X | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | D | D | D | D | D | D | D | X |
| 47 | D | D | D | D | X | X | D | D | D | D | D | D | X | X |
| 48 | D | D | X | X | X | X | D | D | X | X | X | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | D | X | D | D | D | D | D | X | X | U |
| 55 | D | D | X | U | U | U | D | D | X | U | U | U | U | U |
| 56 | D | X | U | U | U | U | D | X | U | U | U | U | U | U |
| 57 | D | D | D | X | X | U | D | D | D | X | X | U | U | U |
| 58 | D | D | X | X | U | U | D | D | X | X | U | U | U | U |
| 59 | D | X | X | U | U | U | D | X | X | U | U | U | U | U |

TABLE 8-continued

| For-mat | Symbol number in slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 60 | D | X | X | X | X | X | U | D | X | X | X | X | X | U |
| 61 | D | D | X | X | X | X | U | D | D | X | X | X | X | U |

<Operating Band in NR>

An operating band in NR is as follows.

TABLE 9

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

TABLE 10

| | | | |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |

On the other hand, when the operating band of the above table is used, the channel bandwidth is used as shown in Table below.

TABLE 11

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the above table, SCS means a subcarrier spacing. In the above table, $N_{RB}$ represents the number of RBs.

On the other hand, when the operating band of the above table is used, the channel bandwidth is used as shown in the table below.

TABLE 12

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

<SS Block in NR>

In 5G NR, a physical broadcast channel (PBCH) including information required for the UE to perform an initial access, that is, a master information block (MIB) and a synchronization signal SS (including PSS and SSS) are defined as an SS block. In addition, a plurality of SS blocks are bound to be defined as an SS burst, and a plurality of SS bursts are bound to be defined as an SS burst set. Each SS block is assumed to be beamformed in a specific direction, and several SS blocks in the SS burst set are designed to support UEs in different directions.

Figure 5:
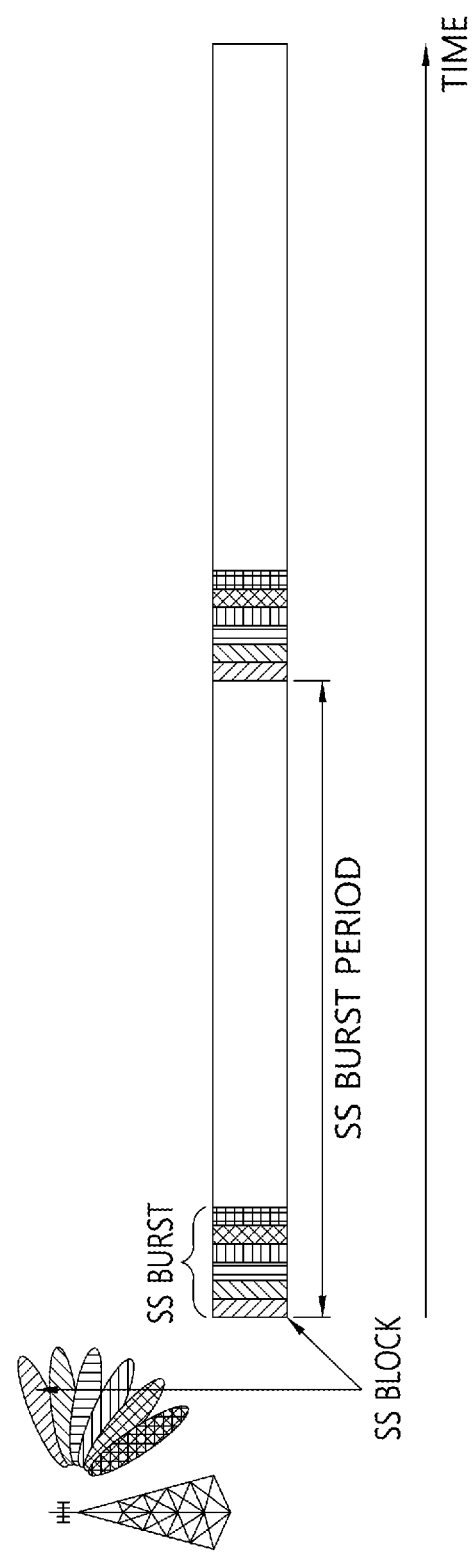
FIG. 5 is an exemplary diagram illustrating an example of an SS block in NR.

FIG. 5 is an Exemplary Diagram Illustrating an Example of an SS Block in NR.

Referring to FIG. 5, the SS burst is transmitted every predetermined periodicity. Therefore, the UE receives the SS block and performs cell detection and measurement.

On the other hand, in 5G NR, beam sweeping is performed on the SS. This will be described with reference to FIG. 6.

Figure 6:
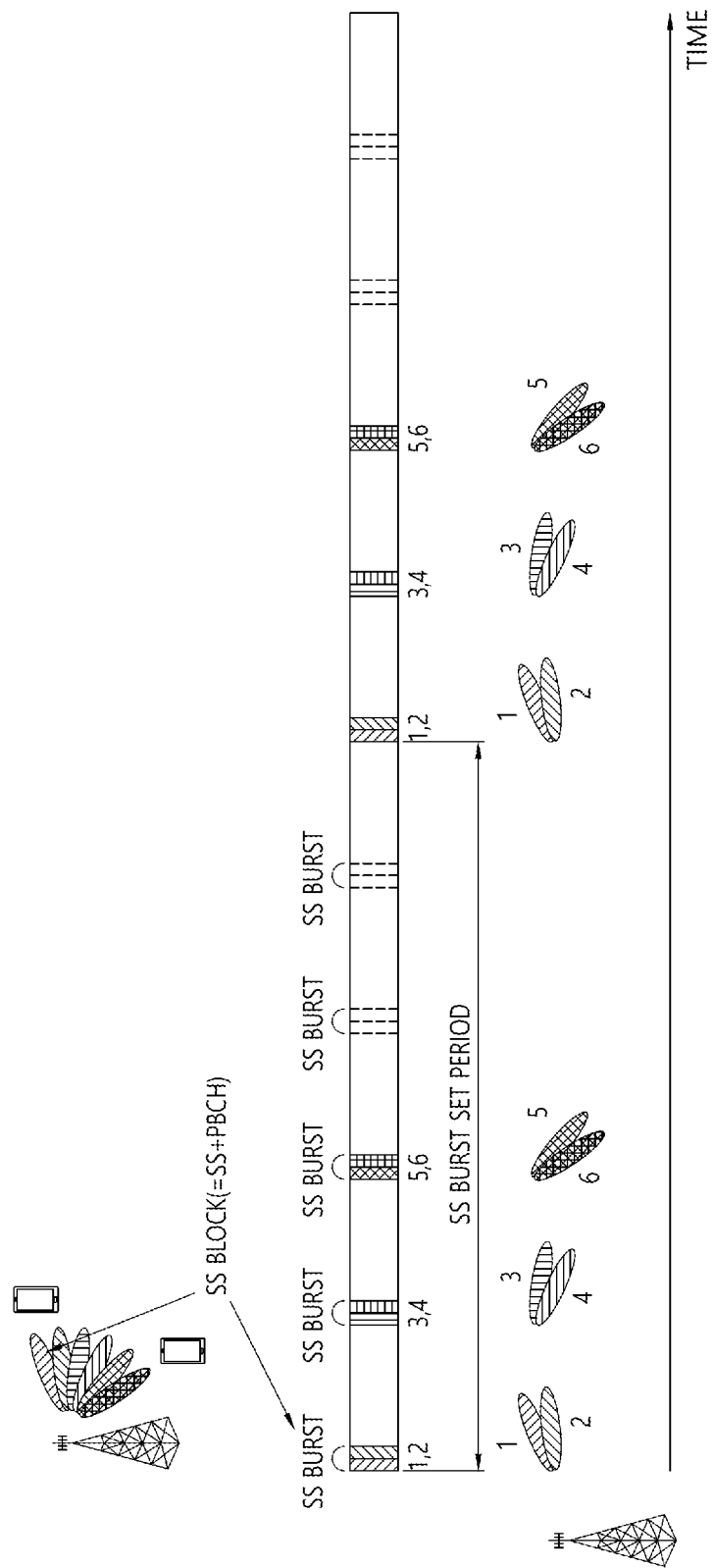
FIG. 6 is an exemplary diagram illustrating an example of beam sweeping in NR.

FIG. 6 is an Exemplary Diagram Illustrating an Example of Beam Sweeping in NR.

The base station transmits each SS block in the SS burst with beam sweeping over time. At this time, the SS blocks in the SS burst set are transmitted in order to support UEs existing in different directions. In FIG. 6, the SS burst set includes SS blocks 1 to 6, and each SS burst includes two SS blocks.

<Disclosure of this Specification>

I. First Disclosure

In the present section, a channel raster and a synchronization raster will be discussed.

A frequency channel raster is defined as a set of RF reference frequencies $F_{REF}$. The RF reference frequency may be used as a signal for indicating the locations of an RF channel, an SS block, and the like.

A global frequency raster is defined for all frequencies of 0 to 100 GHz. The unit of the global frequency raster is denoted by $\Delta F_{Global}$.

The RF reference frequency is specified by an NR absolute radio frequency channel number (NR-ARFCN) in the range of the global frequency raster (0 . . . 2016666). The relationship between the NR-ARFCN and the RF reference frequency $F_{REF}$ of MHz may be expressed by the following equation. Here, $F_{REF\text{-}Offs}$ and $N_{Ref\text{-}Offs}$ are shown in the following Table.

$$F_{REF} = F_{REF\text{-}Offs} + \Delta F_{Global}(N_{REF} - N_{REF\text{-}Offs}) \quad \text{[Equation 1]}$$

TABLE 13

| Frequency range (MHz) | $\Delta F_{Global}$ (kHz) | $F_{REF-Offs}$ (MHz) | $N_{REF-Offs}$ | Range of $N_{REF}$ |
|---|---|---|---|---|
| 0-3000 | 5 | 0 | 0 | 0-599999 |
| 3000-24250 | 15 | 3000 | 600000 | 600000-2016666 |
| 24250-100000 | 60 | 24250.08 | 2016667 | 2016667-3279165 |

The channel raster represents a subset of RF reference frequencies that may be used to identify RF channel locations in the uplink and downlink. The RF reference frequency for the RF channel may be mapped to a resource element on the subcarrier.

The mapping between the RF reference frequency of the channel raster and the corresponding resource element may be used to identify an RF channel location. The mapping depends on the total number of RBs allocated to the channel and is applies to both UL and DL.

In the case of $N_{RB}$ mod 2=0,
an RE index k is 0, and
the PRB number is as follows.

$$n_{PRB} = \left\lfloor \frac{N_{RB}}{2} \right\rfloor$$

In the case of $N_{RB}$ mod 2=1,
an RE index k is 6, and
the PRB number is as follows.

$$n_{PRB} = \left\lfloor \frac{N_{RB}}{2} \right\rfloor$$

The RF channel location of the channel raster on each NR operating band may be represented as shown in the following Table.

TABLE 14

| NR operating band | $\Delta F_{Raster}$ (kHz) | Uplink frequency range of $N_{REF}$ (First-<Step size>-Last) | Downlink frequency range of $N_{REF}$ (First-<Step size>-Last) |
|---|---|---|---|
| n1 | 100 | 384000-<20>-396000 | 422000-<20>-434000 |
| n2 | 100 | 370000-<20>-382000 | 386000-<20>-398000 |
| n3 | 100 | 342000-<20>-357000 | 361000-<20>-376000 |
| n5 | 100 | 164800-<20>-169800 | 173800-<20>-178800 |
| n7 | 100 | 500000-<20>-514000 | 524000-<20>-538000 |
| n8 | 100 | 176000-<20>-183000 | 185000-<20>-192000 |
| n12 | 100 | 139800-<20>-143200 | 145800-<20>-149200 |
| n20 | 100 | 166400-<20>-172400 | 158200-<20>-164200 |
| n25 | 100 | 370000-<20>-383000 | 386000-<20>-399000 |
| n28 | 100 | 140600-<20>-149600 | 151600-<20>-160600 |
| n34 | 100 | 402000-<20>-405000 | 402000-<20>-405000 |
| n38 | 100 | 514000-<20>-524000 | 514000-<20>-524000 |
| n39 | 100 | 376000-<20>-384000 | 376000-<20>-384000 |
| n40 | 100 | 460000-<20>-480000 | 460000-<20>-480000 |
| n41 | 15 | 499200-<3>-537999 | 499200-<3>-537999 |
|  | 30 | 499200-<6>-537996 | 499200-<6>-537996 |
| n51 | 100 | 285400-<20>-286400 | 285400-<20>-286400 |
| n66 | 100 | 342000-<20>-356000 | 422000-<20>-440000 |
| n70 | 100 | 339000-<20>-342000 | 399000-<20>-404000 |
| n71 | 100 | 132600-<20>-139600 | 123400-<20>-130400 |
| n75 | 100 | N/A | 286400-<20>-303400 |
| n76 | 100 | N/A | 285400-<20>-286400 |
| n77 | 15 | 620000-<1>-680000 | 620000-<1>-680000 |
|  | 30 | 620000-<2>-680000 | 620000-<2>-680000 |
| n78 | 15 | 620000-<1>-653333 | 620000-<1>-653333 |
|  | 30 | 620000-<2>-653332 | 620000-<2>-653332 |
| n79 | 15 | 693334-<1>-733333 | 693334-<1>-733333 |
|  | 30 | 693334-<2>-733332 | 693334-<2>-733332 |
| n80 | 100 | 342000-<20>-357000 | N/A |
| n81 | 100 | 176000-<20>-183000 | N/A |
| n82 | 100 | 166400-<20>-172400 | N/A |
| n83 | 100 | 140600-<20>-149600 | N/A |
| n84 | 100 | 384000-<20>-396000 | N/A |
| n86 | 100 | 342000-<20>-356000 | N/A |

TABLE 15

| NR operating band | $\Delta F_{Raster}$ (kHz) | Uplink and downlink frequency range (First-<Step size>-Last) |
|---|---|---|
| n257 | 60 | 2054166-<1>-2104165 |
|  | 120 | 2054167-<2>-2104165 |
| n258 | 60 | 2016667-<1>-2070832 |
|  | 120 | 2016667-<2>-2070831 |
| n260 | 60 | 2229166-<1>-2279165 |
|  | 120 | 2229167-<2>-2279165 |
| n261 | 60 | 2070833-<1>-2084999 |
|  | 120 | 2070833-<2>-2087497 |

On the other hand, the synchronization raster represents the frequency location of the SS block used to obtain system information by the UE. The frequency location of the SS block may be defined as $SS_{REF}$ using the corresponding GSCN number.

I-1. Relationship Between Channel Raster and Synchronization Raster

In the present section, a synchronization raster considering the concept of floating synchronization will be described.

In the existing LTE/LTE-A, since a synchronization signal has been located at the center of a channel bandwidth (CBW), a synchronization raster and a channel raster are equally handled.

However, in NR, the SS block is not at the center of the channel bandwidth (CBW). Also, in NR, multiple SS blocks may be arranged in an FDM scheme considering a broadband operation. Once NR UE detects an SS block, the NR UE may receive signaling information from the network. That is, the channel raster is mainly associated with provider's spectral retention, while the synchronization raster may be more important in terms of UE implementation. Considering the synchronization raster, the SS block may be aligned with a center frequency of the data by at least subcarrier. Otherwise, inter-channel interference (ICI) between the data and the SS block may occur.

As a result, the data signal and the SS block need to be aligned at least in units of the subcarrier.

$$R_{SS} = \text{floor}((CBW_{\text{eff-min}} - BW_{SS} + 1RB)/R_{CH}) * R_{CH}$$

Here, $R_{SS}$ represents a synchronization raster.

$CBW_{\text{eff-min}}$ refers to an effective minimum bandwidth of the subcarrier.

$BW_{SS}$ refers to a bandwidth of the SS block.

$R_{CH}$ refers to a channel raster.

Basically, the above equation means that the synchronization raster is a multiple of the channel raster.

For a first input of the synchronization raster, the following Equation may be considered because the minimum CBW for each frequency band is much larger than the channel raster.

$$F_{SS0}=F_{DL\_low}+\text{floor}((0.5*(CBW_{min}+CBW_{\textit{eff-min}})-BW_{SS})/R_{CH})*R_{CH} \quad \text{[Equation 3]}$$

In the above Equation, $F_{DL\_LOW}$ refers to a start frequency of each frequency band.

On the other hand, an actual synchronization raster entry for each frequency band may be determined as follows.

$$F_{SS}=F_{SS0}+n*R_{SS} \quad \text{[Equation 4]}$$

In Equations 2 and 3 above, an example of the synchronization raster is shown in the following Table.

TABLE 16

| Frequency range | Band reformed from LTE (below 2.4 GHz) | NR band below 6 GHz | | mmWave band | |
| --- | --- | --- | --- | --- | --- |
| Synchronization raster unit [kHz] | 100 | 15 | | 60 | |
| Subcarrier spacing of SS (SCS$_{SS}$) [kHz] | 15 | 15 | 30 | 120 | 240 |
| The number of SS subcarriers | 288 | 288 | 288 | 288 | 288 |
| Bandwidth (BW$_{SS}$) of SS [MHz] | 4.32 | 4.32 | 8.64 | 34.56 | 69.12 |
| Minimum bandwidth (CBW) [MHz] | 5 | 5 | 10 | 50 | 100 |
| Subcarrier spacing of data (SCS$_{Data}$) [kHz] | 15 | 15 | 15 | 60 | 120 |
| Agreed SU [NRB] | 25 | 25 | 52 | 66 | 66 |
| Effective channel bandwidth (CBW) [MHz] | 4.5 | 4.5 | 9.36 | 47.52 | 95.04 |
| SS offset from the outside of band [kHz] | 400 | 420 | 1035 | 14160 | 28380 |
| SS raster [kHz] | 300 | 360 | 885 | 13680 | 26640 |

Based on the table, the following options are proposed.

Option 1: The synchronization raster may be configured in units of 100 kHz.

Option 2: The synchronization raster may be configured as a multiple of a subcarrier spacing.

On the other hand, another alternative is needed to maintain the orthogonality between the data and the SS because the channel raster of 100 kHz is not a multiple of the subcarrier spacing (SCS) (e.g., 15/30/60 kHz). Since the least common multiple (LCM) of 100 kHz and 15 kHz is 300 kHz, the synchronization entry of three times may be used. This means that three synchronization raster entries shifted by ⅓ SCS within the same frequency band are superimposed. A 100 kHz raster-based synchronization raster may be evaluated based on Equation 1, and the evaluated values are shown in Table below by considering 5 MHz CBW and 15 kHz SCS. From the evaluated results, it seems that since the effective synchronization raster is still 100 kHz when considering three times superimposition, there is no advantage of floating synchronization. In addition to the synchronization raster entry, one more PRB may be required for the floating synchronization. In the band reframed from the LTE, it is expected that the spectrum and the frequency band retained by the provider are relatively narrower than those of a new NR dedicated band. Therefore, it is considered that a broadband operation is not a top priority. Based thereon, when the 100 kHz channel raster is used, it may be effective to use option 1 in the band reframed from the LTE.

Thus, the band reformed from LTE using the 100 kHz channel raster is proposed as follows.

Proposal: Using synchronization raster of 100 kHz without using the floating synchronization On the other hand, the subcarrier spacing of the SS block will be described as follows.

The subcarrier spacing for the PSS/SSS may be differentially defined with respect to the following frequency ranges.

1) In the case below 6 GHz, 15 kHz/30 kHz

2) In the case of 6 GHz or more, 120 kHz/240 kHz

Since information on the subcarrier spacing SCS$_{SS}$ for the SS may be signaled to non-stand alone (NSA) UE, it is not particularly problematic.

However, there is a problem when the stand-alone (SA) UE performs initial cell detection.

Using multiple SCS$_{SS}$ may require more assumptions for the SS block and affect complexity, power consumption of the UE, and an initial cell detection time.

In Tables 9 and 10 below, the band below 6 GHz and the mmWave are illustrated. In Tables 9 and 10, in the band below 6 GHz, a single subcarrier spacing may be used for the SS block. Also, in the case of the mmWave band, multiple SCS$_{SS}$ may be used for all currently available frequency bands.

TABLE 17

| Band of 6 GHz or less | Minimum channel bandwidth | Subcarrier spacing (SCS) of SS block |
| --- | --- | --- |
| 1 | 5 MHz | 15 kHz |
| 3 | 5 MHz | 15 kHz |
| 5 | 10 MHz/5 MHz | [30 kHz/15 kHz] |
| 7 | 5 MHz | 15 kHz |
| 8 | 5 MHz | 15 kHz |
| 20 | 5 MHz | 15 kHz |
| 28 | 5 MHz | 15 kHz |
| 41 | 10 MHz | 30 kHz |
| 66 | 5 MHz/10 MHz | [15 kHz/30 kHz] |
| 70 | 5 MHz | 15 kHz |
| 71 | 5 MHz | 15 kHz |
| 1.427-1.518 GHz | 5 MHz | 15 kHz |
| 3.3-3.8 GHz | 10 MHz | [15 kHz/30 kHz] |
| 3.3-4.2 GHz | 10 MHz | [15 kHz/30 kHz] |
| 4.4-4.99 GHz | [40 MHz] | 30 kHz |

TABLE 18

| mmWave band | Minimum channel bandwidth | Subcarrier spacing (SCS) of SS block |
| --- | --- | --- |
| 24.25-27.5 GHz | 50 MHz | 120 kHz/240 kHz |
| 26.5-29.5 GHz | 50 MHz | 120 kHz/240 kHz |
| 31.8-33.4 GHz | 50 MHz | 120 kHz/240 kHz |
| 37-40 GHz | 50 MHz | 120 kHz/240 kHz |

Based on the above-described contents, the following Options may be considered.

Option 1) An SS block redesign, particularly, reducing the bandwidth of the SS block in the PBCH may be considered.

Option 2) It may be considered to specify a different band number for each $SCS_{SS}$ for the same frequency range.

Option 3) It may be considered to specify a single basic $SCS_{SS}$ for each band.

Option 4) It may be considered to allow multiple SS SCS for some frequency bands.

In the case of option 1 above, the NR cell range may be affected due to the deterioration of target performance of the PBCH design in the SS block.

In the case of option 2, it may be inefficient to redefine the band.

In the case of option 3, contradictions may occur depending on the spectrum retained by the provider.

In case of option 4, UE complexity is not important if the UE may sequentially perform initial cell detection. According to option 4, only the initial cell detection time of some stand-alone (SA) UEs may be affected and high-performance UE that may perform an improved initial cell detection procedure may not be affected.

Therefore, it may be proposed as follows.

Proposal 1. It may be considered to specify a basic SCS for the SS as a first priority in the band-by-band manner.

Proposal 2. When multiple $SCS_{SS}$ is allowed, it may be assumed that the initial cell detection is performed sequentially.

II. Second Disclosure

In the present section, an initial cell detecting operation of the NR UE will be described. In particular, an operation of the NR UE on a band switched from LTE using a 100 kHz channel raster will be described.

Multiple basic $SCS_{SS}$ may be considered as follows.

Multiple SCS is proposed as follows with respect to a specific frequency band.

Alt 1: The SS block may be designed again by reducing a PBCH bandwidth to 12 PRBs.

Alt 2: Up to two SCS values may be selected with respect to the SS/PBCH and a minimum bandwidth of the UE may be selected with respect to each band of a restricted set.

In the case of Alt 1 above, PBCH decoding performance may be influenced, and as a request, an NR cell range may be reduced.

In the case of Alt 2 above, when a plurality of basic $SCS_{SS}$, initial cell detection for a stand alone (SA) UE may be influenced. A non-stand alone (NSA) UE may receive information on the $SCS_{SS}$ through LTE RAT. However, in the case of the SA UE, even though single basic $SCS_{SS}$ is used, a potential UE implementation problem may occur in some frequency bands. Further, when multiple $SCS_{SS}$ is specified, the UE needs to perform search according to various combinations, so UE implementation complexity and power consumption may increase and the UE may be influenced even by an initial cell detection time.

Result 1). Using the single basic $SCS_{SS}$ may be effective in terms of UE implementation/power consumption and the initial cell time.

Therefore, using multiple basic $SCS_{SS}$ is permitted and FEO,

Proposal 1) The UE may sequentially perform the initial cell detection.

Proposal 2) The requirement for the initial cell detection may not be designated similarly to the LTE.

By the above method, the UE may perform the initial cell detection even in a band in which multiple is defined without improvement of hardware and a required time which is a disadvantage may be overcome through a separate configuration or signaling.

II-1. Synchronization Raster

In the existing LTE/LTE-A, since a synchronization signal is located at the center of a channel bandwidth (CBW), the synchronization signal is handled equally to a synchronization raster and a channel raster.

However, in the NR, the SS block is not at the center of the channel bandwidth (CBW). Further, in the NR, multiple SS blocks may be arranged in an FDM scheme considering a broadband operation. Once the NR UE detects the SS block, the NR UE may receive signaling information from the network. That is, the channel raster is mainly associated with provider's spectral retention, while the synchronization raster may be more important in terms of UE implementation. For definition of the synchronization raster, since the UE needs to adjust a frequency of a mixer in an RF unit during the initial cell detection time, the synchronization raster needs to represent an actual frequency location of the mixer. Therefore, the synchronization raster may be proposed as follows.

Proposal) The synchronization raster needs to be located at the center of the SS block.

When the synchronization raster is considered, two followings need to be considered for the initial cell detection.

The subcarrier of the SS block needs to be aligned with the subcarrier of the data signal in order to avoid the ICI.

At least one SS block may be located in the CBW of the UE which operates in a minimum CBW.

Based thereto, an actual synchronization raster for the initial cell detection may be formulated as follows.

$$R_{SS}=\text{floor}((CBW_{\mathit{eff-min}}-BW_{SS}+R_{CH})/R_{CH})*R_{CH} \quad \text{[Equation 5]}$$

Here, $R_{SS}$ represents the synchronization raster.

$CBW_{\mathit{eff-min}}$ represents a minimum bandwidth of the carrier which may be effective.

$BW_{SS}$ represents the bandwidth of the SS block.

$R_{CH}$ represents the channel raster.

In Equation 1 above, when a synchronization raster value is described as an example by considering a minimum CBW/SCS set, the synchronization raster value is described in a table below.

TABLE 19

| Frequency range | Band refarmed from LTE (2.4 GHz or less) | | NR band of 6 GHz or less | | mmWave band | |
|---|---|---|---|---|---|---|
| Minimum channel bandwidth (CBW) [MHz] | 5 | 10 | 5 | 10 | 50 | 100 |
| Data subcarrier spacing ($SCS_{Data}$) [kHz] | 15 | 30 | 15 | 30 | 60 | 120 |
| Channel raster [kHz] | 100 | | 15 | | 60 | |
| $SCS_{SS}$ [kHz] | 15 | 30 | 15 | 30 | 120 | 240 |
| Number of SS carriers | 288 | 288 | 288 | 288 | 288 | 288 |
| SS bandwidth ($BW_{SS}$) [MHz] | 4.32 | 8.64 | 4.32 | 8.64 | 34.56 | 69.12 |
| Agreed SU [NRB] | 25 | 24 | 25 | 24 | 66 | 66 |
| Channel bandwidth which may be effective CBW) [MHz] | 4.5 | 8.64 | 4.5 | 8.64 | 47.52 | 95.04 |
| SS raster [kHz] | 200 | 100 | 195 | 15 | 13020 | 25980 |

From the above table, the synchronization raster may be proposed as follows. Proposal: One of values of the above table may be used with respect to the synchronization raster.

II-2. Synchronization Raster for 100 kHz Channel Raster

The 100 kHz channel raster may be used with respect to a frequency band of 2.4 GHz or less. Since the 100 kHz channel raster is not a multiple, when the SCS is 15 kHz, there may be additional considerations to ensure orthogonality between the data subcarrier and the SS block subcarrier when floating synchronization is used.

When 300 kHz which is a minimum common multiple of 100 kHz and 15 kHz is considered, synchronization may be performed up to three times for the synchronization raster. This may mean that three different synchronization signals need to be used. This may influence the UE implementation. When three synchronization signals are not intended to be used as an alternative, the following options may be considered.

When the 100 kHz channel raster is used and the band refarmed from the LTE I used, Option) The UE may detect the cell only by a specific SS block.

In the case of the above option, gNB which operates in a broadband may generally transmit multiple SS blocks. However, since the synchronization raster is not continuously aligned with a subcarrier boundary, the specific SS block from gNB may be detected by the UE during the initial cell detection time. However, when there is a method for notifying a secondary SSB location to the UE, the UE may activate secondary BWP after detecting an initial cell.

Further, the orthogonality between the data and the SS block needs to be maintained. The channel raster itself may not have to guarantee orthogonality with other adjacent channel raster. Thus, when the synchronization raster may represent a specific subcarrier, the channel raster may represent the specific subcarrier. Further, if the synchronization raster may not be adjusted with respect to the 100 kHz channel raster, the synchronization raster needs to be placed in a channel center. In this sense, the synchronization raster needs to be the multiple of the channel raster and the synchronization raster may have to be overlaid on the channel raster for a frequency band that uses at least the 100 kHz channel raster.

The band using the 100 kHz channel raster may be proposed as follows.

Proposal) The channel raster needs to be located at the center of the CBW.

Proposal) The synchronization raster may be overlaid on the channel raster.

By the above method, the UE may define the synchronization raster that is to perform the initial cell search. Further, when the broadband is used, in the case where the UE is attached to the cell by using specific SSB by the proposed method, the cell may transfer configuration information for second BWP to the UE, and as a result, it may be necessary to additionally increase the raster.

III. Third Disclosure

Cell search in the 5G NR network is performed in a predefined synchronization raster and it is desirable to set the number of such synchronization rasters as small as possible in each frequency band, considering the time required and the power consumption for the UE are considered. However, in a current NR frequency band, in the case of the band refarmed from the existing LTE, the 100 kHz channel raster needs to be applied similarly to the LTE for coexistence with the existing LTE system. In this case, since the 100 kHz channel raster is not the multiple of the subcarrier spacing of 15 kHz, the orthogonality between the data and the synchronization signal may not be maintained. In the present section, an additional operation of the UE related with the proposal for solving that the orthogonality is not maintained will be described.

III-1. Basic Principle for Synchronization Raster

In the existing LTE/LTE-A, since the synchronization signal is located at the center of the channel bandwidth (CBW), the synchronization signal is handled equally to the synchronization raster and the channel raster. However, in the NR, the SS block is not at the center of the channel bandwidth (CBW). Further, in the NR, multiple SS blocks may be arranged in an FDM scheme considering a broadband operation. Once the NR UE detects the SS block, the NR UE may receive the signaling information from the network. That is, the channel raster is mainly associated with provider's spectral retention, while the synchronization raster may be more important in terms of UE implementation. For the definition of the synchronization raster, since the UE needs to adjust a frequency of the mixer in the RF unit during the initial cell detection time, the synchronization raster needs to represent an actual frequency location of the mixer. Therefore, the synchronization raster may be proposed as follows.

Proposal) The synchronization raster needs to be located at the center of the SS block.

When the synchronization raster is considered, two followings need to be considered for the initial cell detection.

The subcarrier of the SS block needs to be aligned with the subcarrier of the data signal in order to avoid the ICI.

At least one SS block may be located in the CBW of the UE which operates in a minimum CBW.

Based thereto, the actual synchronization raster for the initial cell detection may be formulated as follows.

$$R_{SS} = \text{floor}((CBW_{\textit{eff-min}} - BW_{SS} + R_{CH})/R_{CH})*R_{CH} \quad \text{[Equation 6]}$$

Here, $R_{SS}$ represents the synchronization raster.

$CBW_{\textit{eff-min}}$ represents a minimum bandwidth of the carrier which may be effective.

$BW_{SS}$ represents the bandwidth of the SS block.

$R_{CH}$ represents the channel raster.

III-2. Synchronization Raster for Band Refarmed from LTE

The 100 kHz channel raster may be used in the case of the frequency band of 2.4 GHz or less. Since the 100 kHz channel raster is not the multiple of the SCS of 15 kHz, more considerations are required for maintaining the orthogonality between the subcarrier of the data signal and the subcarrier of the SS block signal. Two following methods may be considered in order to maintain the orthogonality with the 100 kHz channel raster.

Option 1. The synchronization raster may be calculated by assuming 300 kHz effective channel raster and three multiple synchronization raster sets shifted to 100 kHz may be used.

Option 2. A single synchronization raster calculated by assuming the 100 kHz channel raster may be used. In this case, the UE may assume that three synchronization rasters shifted to 5 kHz are implicitly located at each location which is predefined.

Figure 7A:
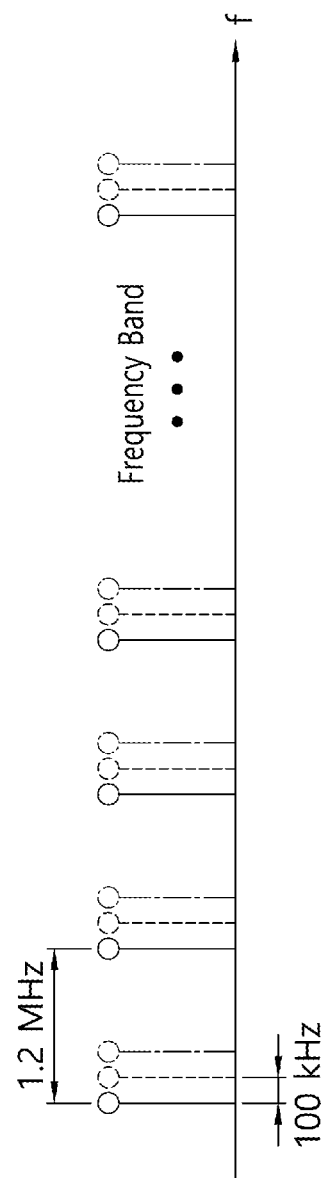
FIG. 7A illustrates an example of a synchronization raster according to Option 1 of Section III-2.
Figure 7B:
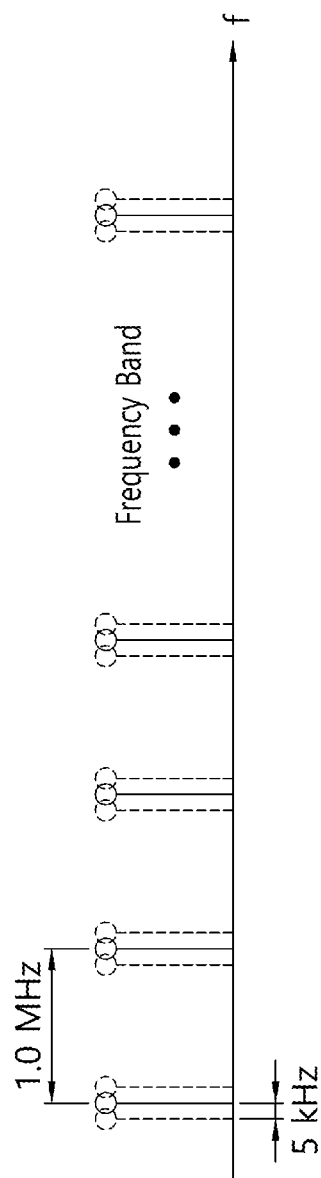
FIG. 7B illustrates an example of a synchronization raster according to Option 2 of Section III-2.

FIG. 7A Illustrates an Example of a Synchronization Raster According to Option 1 of Section III-2 and FIG. 7B Illustrates an Example of a Synchronization Raster According to Option 2 of Section III-2.

First, the channel raster is in units of 100 kHz. Therefore, the multiple of the SCS of 15 kHz may not be aligned with the channel raster.

Referring to FIG. 7A, three synchronization rasters may be shifted and arranged in units of 100 kHz. Each synchronization raster may be arranged at an interval of 1.2 MHz.

Referring to FIG. 7B, three synchronization rasters may be shifted and arranged in units of 5 kHz. Each synchronization raster may be arranged at an interval of 1 MHz.

In the case of option 1 above, the synchronization raster of each set may be calculated by assuming the effective channel raster of 300 kHz and each synchronization raster may be arranged every 1.2 MHz. In the case of option 2 above, the synchronization raster may be calculated by assuming an actual channel raster of 100 kHz and each synchronization raster may be arranged every 1.0 MHz. When the total number of calculations of an SS correlation is considered, option 1 may be more efficient than option 2.

When option 2 is adopted, the UE may rapidly perform the cell search and reduce power consumption by using an improved cell detecting operation. Further, since the bandwidth of the PBCH is reduced, the synchronization raster of 1 MHz may not significantly increase UE complexity. In this case, the UE may perform tuning of the RF unit in the single raster and an offset up to remaining ±5 kHz may be processed through CFO detected together during detection of the corresponding SS block. In this case, a detecting operation of the SS block actually performed by the UE may be significantly reduced. Further, a method may be considered, in which when the UE detects the SS block, the UE may acquire information on the corresponding offset through MIB to enhance reception performance of remaining minimum system information (RMSI). Therefore, the method may be proposed as follows.

Proposal: When the 100 kHz channel raster is used, option 2 may be used.

Based on option 1 above, the number of synchronization rasters may be organized as shown in the table below with respect to the existing NR frequency band.

TABLE 20

| NR band | DL frequency band | BW [MHz] | $\Delta F_{CR}$ [kHz] | Data subcarrier spacing ($SCS_{Data}$) [kHz] | CBWmin/ $SCS_{SS}$ | $\Delta F_{SR}$ [MHz] | Number of synchronization rasters | Total number of synchronization rasters |
|---|---|---|---|---|---|---|---|---|
| n1 | 2110-2170 | 60 | 100 | 15 | 5 MHz/15 kHz | 1.2 | 147 (3 × 49) | 147 |
| n2 | 1930-1990 | 60 | 100 | 15 | 5 MHz/15 kHz | 1.2 | 147 (3 × 49) | 147 |
| n3 | 1805-1880 | 75 | 100 | 15 | 5 MHz/15 kHz | 1.2 | 186 (3 × 62) | 186 |
| n5 | 869-894 | 25 | 100 | 15 | 5 MHz/15 kHz | 1.2 | 60 (3 × 20) | 105 |
|  |  |  |  | 30 | 10 MHz/30 kHz | 1.5 | 45 (3 × 15) |  |
| n7 | 2620-2690 | 70 | 100 | 15 | 5 MHz/15 kHz | 1.2 | 171 (3 × 57) | 171 |
| n8 | 925-960 | 35 | 100 | 15 | 5 MHz/15 kHz | 1.2 | 84 (3 × 28) | 84 |
| n20 | 791-821 | 30 | 100 | 15 | 5 MHz/15 kHz | 1.2 | 72 (3 × 24) | 72 |
| n28 | 758-803 | 45 | 100 | 15 | 5 MHz/15 kHz | 1.2 | 108 (3 × 36) | 108 |
| n38 | 2570-2620 | 50 | 100 | 30 | 10 MHz/30 kHz | 1.5 | 96 (3 × 32) | 96 |
| n50 | 1432-1517 | 85 | 100 | 15 | 5 MHz/15 kHz | 1.2 | 210 (3 × 70) | 210 |
| n51 | 1427-1432 | 5 | 100 | 15 | 5 MHz/15 kHz | N/A | 1 | 1 |
| n66 | 2110-2200 | 90 | 100 | 15 | 5 MHz/15 kHz | 1.2 | 222 (3 × 74) | 399 |
|  |  |  |  | 30 | 10 MHz/30 kHz | 1.5 | 177 (3 × 59) |  |
| n70 | 1995-2020 | 25 | 100 | 15 | 5 MHz/15 kHz | 1.2 | 60 (3 × 20) | 60 |
| n71 | 617-652 | 35 | 100 | 15 | 5 MHz/15 kHz | 1.2 | 84 (3 × 28) | 84 |
| n74 | 1475-1518 | 43 | 100 | 15 | 5 MHz/15 kHz | 1.2 | 105 (3 × 35) | 105 |
| n76 | 1427-1432 | 5 | 100 | 15 | 5 MHz/15 kHz | N/A | 1 | 1 |

$\Delta F_{SR}$ represents that among three synchronization rasters, each synchronization raster is located at an interval indicated by $\Delta F_{SR}$ on the frequency axis. In the above table, when the channel bandwidth of 100 kHz is used in the band refarmed from the LTE, three synchronization rasters shifted every 100 kHz may be used. Each synchronization raster may be calculated by assuming the 300 kHz channel raster.

For example, in the case of band n5 of the above table, the bandwidth is 25 MHz and $\Delta F_{CR}$ is 100 kHz. In this case, when the subcarrier spacing (SCSData) of data is 15 kHz, the number of synchronization rasters is 60 and when the subcarrier spacing (SCSData) of data is 30 kHz, the number of synchronization rasters is 45. Thus, the total number of synchronization rasters which may be effective in band n5 is 105 (=60+45).

Meanwhile, based on option 2 above, the synchronization raster may be organized as shown in the table below with respect to the existing NR frequency band.

Option 4) For standard alone (SA) arrangement, there may be a restriction on using the channel raster.

Figure 8B:
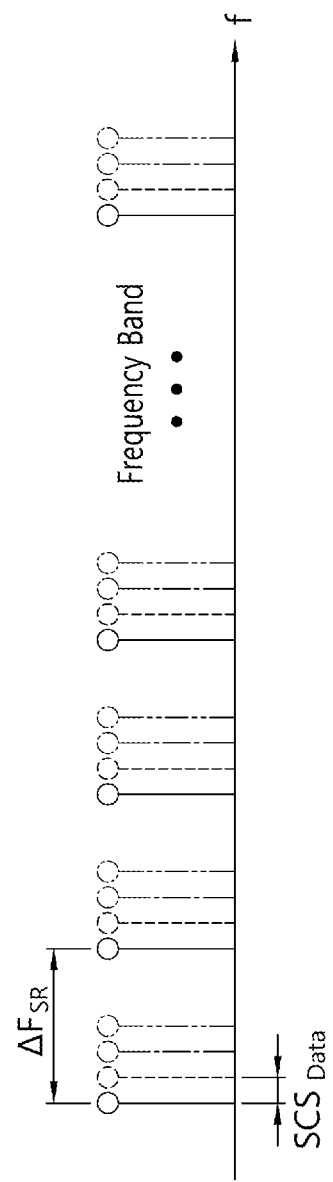
FIG. 8B illustrates an example of a synchronization raster according to Option 4 of Section III-2.

FIG. 8A Illustrates an Example of a Synchronization Raster According to Option 3 of Section III-3 and FIG. 8B Illustrates an Example of a Synchronization Raster According to Option 4 of Section III-2.

Referring to FIG. 8A, for the SCS based channel raster, when mixed numerology is used between the data and the SS block, allocation of the synchronization raster to $SCS_{SS}$ of

TABLE 21

| NR band | DL frequency band | Bandwidth (BW) [MHz] | $\Delta F_{CR}$ [kHz] | Data sub-carrier spacing ($SCS_{Data}$) [kHz] | CBWmin/ $SCS_{SS}$ | $\Delta F_{SR}$ [MHz] | Number of synchronization rasters | Total number of synchronization rasters |
|---|---|---|---|---|---|---|---|---|
| n1 | 2110-2170 | 60 | 100 | 15 | 5 MHz/15 kHz | 1 | 177 (3 × 59) | 177 |
| n2 | 1930-1990 | 60 | 100 | 15 | 5 MHz/15 kHz | 1 | 177 (3 × 59) | 177 |
| n3 | 1805-1880 | 75 | 100 | 15 | 5 MHz/15 kHz | 1 | 222 (3 × 74) | 222 |
| n5 | 869-894 | 25 | 100 | 15 | 5 MHz/15 kHz | 1 | 72 (3 × 24) | 117 |
|  |  |  |  | 30 | 10 MHz/30 kHz | 1.5 | 45 (3 × 15) |  |
| n7 | 2620-2690 | 70 | 100 | 15 | 5 MHz/15 kHz | 1 | 207 (3 × 69) | 207 |
| n8 | 925-960 | 35 | 100 | 15 | 5 MHz/15 kHz | 1 | 102 (3 × 34) | 102 |
| n20 | 791-821 | 30 | 100 | 15 | 5 MHz/15 kHz | 1 | 87 (3 × 29) | 87 |
| n28 | 758-803 | 45 | 100 | 15 | 5 MHz/15 kHz | 1 | 132 (3 × 44) | 132 |
| n38 | 2570-2620 | 50 | 100 | 30 | 10 MHz/30 kHz | 1.5 | 96 (3 × 32) | 96 |
| n50 | 1432-1517 | 85 | 100 | 15 | 5 MHz/15 kHz | 1 | 252 (3 × 84) | 252 |
| n51 | 1427-1432 | 5 | 100 | 15 | 5 MHz/15 kHz | N/A | 1 | 1 |
| n66 | 2110-2200 | 90 | 100 | 15 | 5 MHz/15 kHz | 1 | 267 (3 × 89) | 444 |
|  |  |  |  | 30 | 10 MHz/30 kHz | 1.5 | 177 (3 × 59) |  |
| n70 | 1995-2020 | 25 | 100 | 15 | 5 MHz/15 kHz | 1 | 72 (3 × 24) | 72 |
| n71 | 617-652 | 35 | 100 | 15 | 5 MHz/15 kHz | 1 | 102 (3 × 34) | 102 |
| n74 | 1475-1518 | 43 | 100 | 15 | 5 MHz/15 kHz | 1 | 126 (3 × 42) | 126 |
| n76 | 1427-1432 | 5 | 100 | 15 | 5 MHz/15 kHz | N/A | 1 | 1 |

In the above table, $\Delta F_{SR}$ represents that among three synchronization rasters, each synchronization raster is located at an interval indicated by $\Delta F_{SR}$ on the frequency axis.

In the above table, when the channel bandwidth of 100 kHz is used in the band reframed from the LTE, the synchronization raster may be calculated by assuming the 100 kHz channel raster. The UE may assume that there are three synchronization rasters shifted every 5 kHz at each location.

III-3. Synchronization Raster for SCS Based Channel Raster

For a frequency band that use an SCS based channel raster, there may be some limitations because units are different between the SCS based channel raster and the offset of the floating synchronization. Thus, the synchronization raster may indicate second and fourth data REs for $SCS_{SS}$ of 120 kHz and 240 kHz, respectively.

In this regard, for the frequency band using the SCS based channel raster, two methods may be considered in the case of numerology in which data and the SS block are mixed.

Option 3) An approach scheme similar to option 1 and option 2 in section III-2 may be used for the SCS based channel raster.

120 kHz is shown. In addition, referring to FIG. 8B, for the SCS based channel raster, when the mixed numerology is used between the data and the SS block, allocation of the synchronization raster to $SCS_{SS}$ of 240 kHz is shown. When option 3 is used, the NR may be arranged in all channel rasters regardless of the restriction on the floating synchronization. However, option 3 requires that the UE performs synchronization processes which are two or four times more than option 4. In the case of option 4, there may be a restriction on using the channel raster. For example, the second and fourth channel rasters may be used only in a stand alone (SA) environment using 120 kHz and 240 kHz $SCS_{SS}$, respectively. Considering that the NR band is relatively wider than the LTE/LTE-A band, option 4, which uses the mixed numerology the data and the SSB may be more efficient for the frequency band using the SCS based channel raster.

Therefore, the synchronization raster may be proposed as follows.

In the case of the NR frequency band using the SCS based channel raster, the synchronization raster is organized as shown in the table below.

TABLE 22

| NR band | DL frequency band | BW [MHz] | $F_{CR}$ [kHz] | Data sub-carrier spacing ($SCS_{Data}$) [kHz] | CBWmin/ $SCS_{SS}$ | $\Delta F_{SR}$ [MHz] | Number of synchronization rasters | Total number of synchronization rasters |
|---|---|---|---|---|---|---|---|---|
| n41 | 2496-2690 | 194 | 15 | 15 | 10 MHz/15 kHz | 5.775 | 32 | 298 |
|  |  |  |  | 30 | 10 MHz/30 kHz | 1.44 | 266 (2 × 133) |  |
| n77 | 3.3-4.2 | 900 | 15 | 15 | 10 MHz/30 kHz | 2.16 | 830 (2 × 415) | 830 |
| n78 | 3.3-3.8 | 500 | 15 | 15 | 10 MHz/30 kHz | 2.16 | 460 (2 × 230) | 460 |

TABLE 22-continued

| NR band | DL frequency band | BW [MHz] | $F_{CR}$ [kHz] | Data sub-carrier spacing ($SCS_{Data}$) [kHz] | CBWmin/ $SCS_{SS}$ | $\Delta F_{SR}$ [MHz] | Number of synchronization rasters | Total number of synchronization rasters |
|---|---|---|---|---|---|---|---|---|
| n79 | 4.4-5 | 600 | 15 | 15 | 40 MHz/30 kHz | 31.68 | 34 (2 × 17) | 34 |
| n257 | 26.5-29.5 | 3000 | 60 | 60 | 50 MHz/120 kHz | 18.72 | 318 (2 × 159) | 634 |
|  |  |  |  | 120 | 100 MHz/240 kHz | 37.44 | 316 (4 × 79) |  |
| n258 | 24.25-27.5 | 3250 | 60 | 60 | 50 MHz/120 kHz | 18.72 | 344 (2 × 172) | 684 |
|  |  |  |  | 120 | 100 MHz/240 kHz | 37.44 | 340 (4 × 85) |  |
| n260 | 37-40 | 3000 | 60 | 60 | 50 MHz/120 kHz | 18.72 | 318 (2 × 159) | 634 |
|  |  |  |  | 120 | 100 MHz/240 kHz | 37.44 | 316 (4 × 79) |  |

In the above table, $\Delta F_{SR}$ represents that among three synchronization rasters, each synchronization raster is located at an interval indicated by $\Delta F_{SR}$ on the frequency axis. When the mixed numerology is used between the data and synchronization in the SCS based raster, 2/4 multiple synchronization rasters having the SCS offset may be used for option 3 due to the restriction on the floating synchronization. When option 4 is used, a disadvantage of the channel raster due to the multiple synchronization rasters may be overcome.

III-4. Synchronization Raster for Band NR n41

Meanwhile, $SCS_{SS}$ needs to be considered in band n41. In band 41, two options may be present as follows.

Option 1: Fixed to any one value of 30 kHz or 15 kHz
Option 2: Using 15 kHz and 30 kHz as basic $SCS_{SS}$ Since a larger synchronization raster may be advantageous to the UE in terms of the cell detection time and the power consumption, it may be better to choose option 1 for band 41.

Since the minimum channel bandwidth of n41 is 10 MHz, the synchronization raster due to the support of the basic 15 kHz SCS may be somewhat limited compared to the case of basic 30 kHz SCS. Further, in a higher frequency range, larger SCS may be used more. Therefore, the synchronization raster may be proposed as follows.

Proposal: For band n41, as the basic SCS, both 15 kHz and 30 kHz may be used.

Further, with respect to the synchronization raster, in the NR, the MIB on the SS block needs to include information for informing an actual location of the RMSI in order for the UE to detect the SS block and then, receive the RMSI. On the other hand, considering the complexity and the required time for the UE, when the synchronization raster is large, a size of a bit for representing the information also increases. Such an increase in bit results in a decrease in decoding rate, resulting in a decrease in reception performance of the SS block.

Therefore, the present section additionally proposes signaling for indicating the location of the RMSI.

Figure 9:
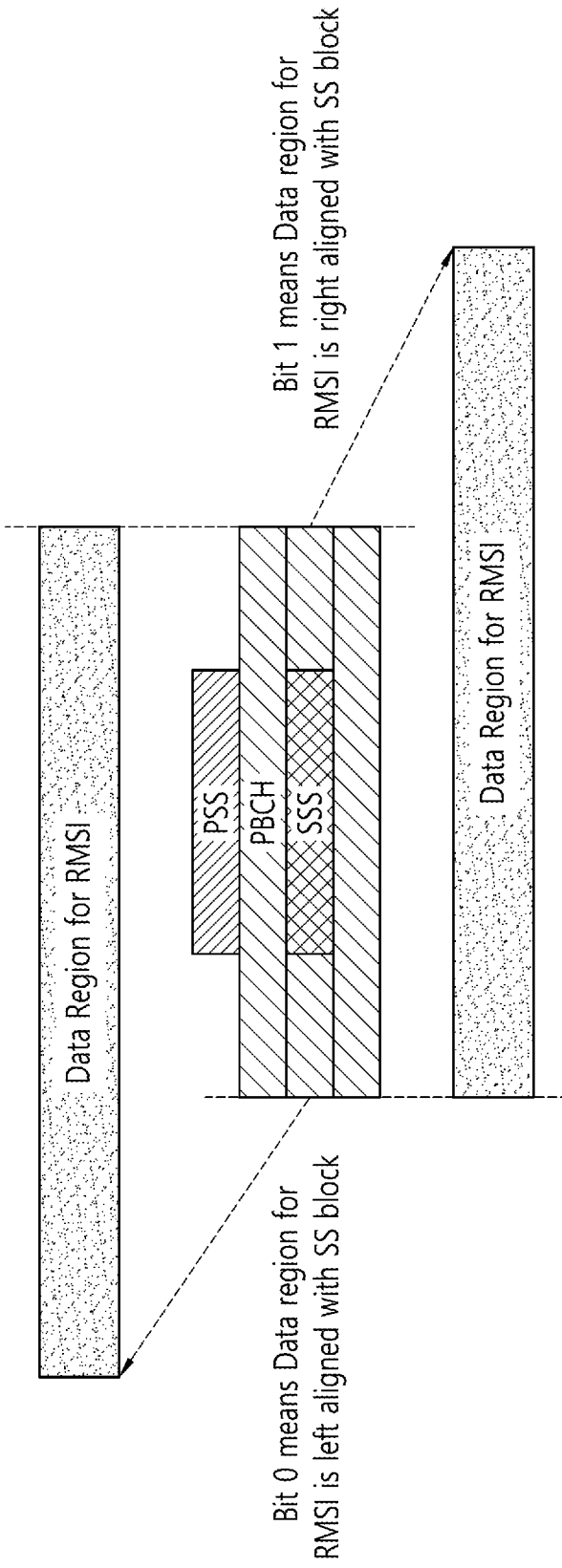
FIG. 9 illustrates an example of signaling for indicating a location of RMSI.

FIG. 9 illustrates an Example of Signaling for Indicating a Location of RMSI.

As illustrated in FIG. 9, information of 1 bit may be added onto the MIB. A frequency-axis offset of a data region may be defined as illustrated in FIG. 9 for RMSI transmission due to the 1 bit.

Figure 10:
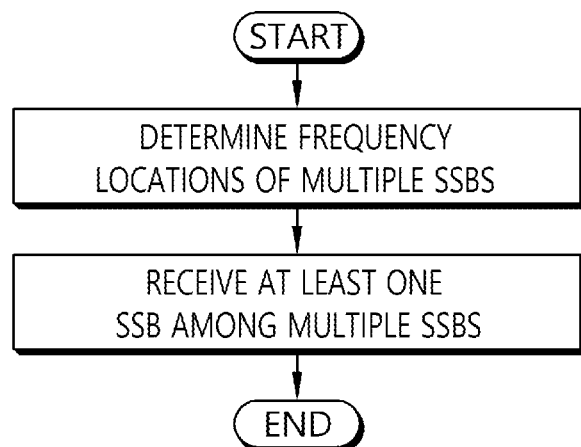
FIG. 10 is a block diagram illustrating a wireless device and a base station in which the disclosure of the present invention is implemented.

FIG. 10 is a Flowchart Schematically Illustrating an Operation of a UE According to the Disclosures of this Specification.

Referring to FIG. 10, a user equipment (UE) determines frequency locations of multiple SSBs. In addition, the UE receives at least one SSB among the multiple SSBs. The multiple SSBs may be arranged to be spaced apart from each other by a predetermined offset. Herein, the predetermined offset may be 100 kHz. The at least one SSB may be located at an interval of 1.2 MHz on the frequency axis. The multiple SSBs may include at least three SSBs.

The at least one SSB may not be located a center frequency of the cell.

The frequency locations may be defined by the synchronization raster. Here, the synchronization raster may be different from the channel raster.

According to the disclosures of this specification, the synchronization raster represents the frequency location of the SS block used to obtain system information by the UE. The frequency location of the SS block may be defined as $SS_{REF}$ using a GSCN number as shown in the table below.

TABLE 23

| Frequency range | SS block frequency location $SS_{REF}$ | GSCN | Range of GSCN |
|---|---|---|---|
| 0-3000 MHz | N * 1200 kHz + M * 50 kHz, N = 1:2499, M ∈ {1, 3, 5} (Note 1) | 3N + (M − 3)/2 | 2-7498 |
| 3000-24250 MHz | 3000 MHz + N * 1.44 MHz N = 0:14756 | 7499 + N | 7499-22255 |
| 24250-100000 MHz | 24250.08 MHz + N * 17.28 MHz, N = 0:4383 | 22256 + N | [22256-26639] |

The synchronization raster for each band is illustrated as follows. A distance between GSCNs is represented as a step size as follows.

TABLE 24

| NR operating band | SS block SCS | Range of GSCN (First-<Step size>-Last) |
|---|---|---|
| n1 | 15 kHz | 5279-<1>-5419 |
| n2 | 15 kHz | 4829-<1>-4969 |
| n3 | 15 kHz | 4517-<1>-4693 |
| n5 | 15 kHz | 2177-<1>-2230 |
|  | 30 kHz | 2183-<1>-2224 |
| n7 | 15 kHz | 6554-<1>-6718 |
| n8 | 15 kHz | 2318-<1>-2395 |
| n12 | 15 kHz | 1828-<1>-1858 |
| n20 | 15 kHz | 1982-<1>-2047 |
| n25 | 15 kHz | 4829-<1>-4981 |

TABLE 24-continued

| NR operating band | SS block SCS | Range of GSCN (First-<Step size>-Last) |
|---|---|---|
| n28 | 15 kHz | 1901-<1>-2002 |
| n34 | 15 kHz | 5030-<1>-5056 |
| n38 | 15 kHz | 6431-<1>-6544 |
| n39 | 15 kHz | 4706-<1>-4795 |
| n40 | 15 kHz | 5756-<1>-5995 |
| n41 | 15 kHz | 6246-<3>-6714 |
|  | 30 kHz | 6252-<3>-6714 |
| n51 | 15 kHz | 3572-<1>-3574 |
| n66 | 15 kHz | 5279-<1>-5494 |
|  | 30 kHz | 5285-<1>-5488 |
| n70 | 15 kHz | 4993-<1>-5044 |
| n71 | 15 kHz | 1547-<1>-1624 |
| n75 | 15 kHz | 3584-<1>-3787 |
| n76 | 15 kHz | 3572-<1>-3574 |
| n77 | 30 kHz | 7711-<1>-8329 |
| n78 | 30 kHz | 7711-<1>-8051 |
| n79 | 30 kHz | 8480-<16>-8880 |
| n257 | 120 kHz | 22388-<1>-22558 |
|  | 240 kHz | 22390-<2>-22556 |
| n258 | 120 kHz | 22257-<1>-22443 |
|  | 240 kHz | 22258-<2>-22442 |
| n260 | 120 kHz | 22995-<1>-23166 |
|  | 240 kHz | 22996-<2>-23164 |
| n261 | 120 kHz | 22446-<1>-22492 |
|  | 240 kHz | 22446-<2>-22490 |

Figure 11:
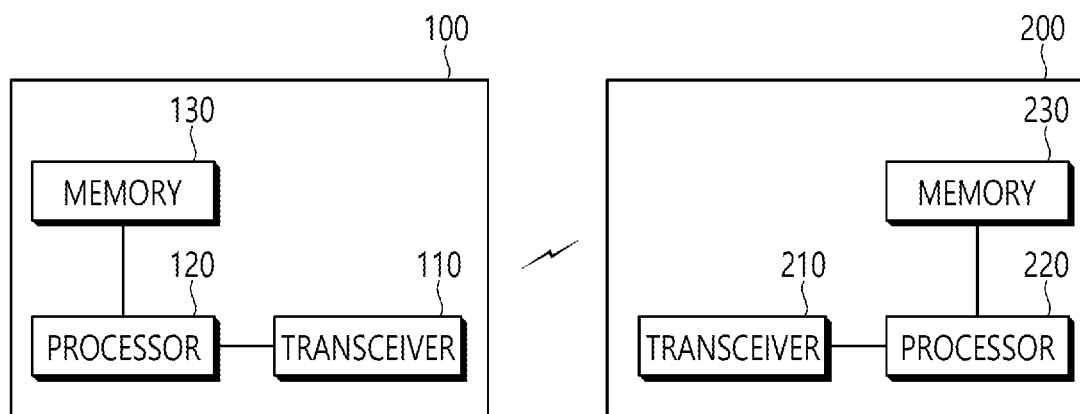
FIG. 11 is a detailed block diagram of a transceiver of the wireless device illustrated in FIG. 10.

The embodiments of the present invention which has been described up to now may be implemented through various means. For example, the embodiments of the present invention may be implemented by hardware, firmware, software, or combinations thereof. In detail, the embodiments will be descried with reference to the drawings. FIG. 11 is a block diagram illustrating a wireless device and a base station in which a disclosure of this specification is implemented.

Referring to FIG. 11, a wireless device 100 and a base station 200 may implement the disclosure of this specification.

The illustrated wireless device 100 includes a processor 101, a memory 102, and a transceiver 103. Similarly, the illustrated base station 200 includes a processor 201, a memory 202, and a transceiver 203. The processors 101 and 201, the memories 102 and 202 and the transceivers 103 and 203 illustrated may be implemented as separate chips, or at least two blocks/functions may be implemented through a single chip.

The transceivers 103 and 203 include transmitters and receivers. When a specific operation is performed, only the operation of either the transmitter or the receiver may be performed, or both the transmitter and the receiver operations may be performed. The transceivers 103 and 203 may include one or more antennas that transmit and/or receive the radio signals. In addition, the transceivers 103 and 203 may include an amplifier for amplifying a reception signal and/or a transmission signal, and a band-pass filter for transmission on a specific frequency band.

The processors 101 and 201 may implement functions, processes, and/or methods proposed in this specification. The processors 101 and 201 may include encoders and decoders. For example, the processors 101 and 202 may perform operations according to the foregoing description. The processors 101 and 201 may include an application-specific integrated circuit (ASIC), another chipset, a logic circuit, a data processing device and/or a converter converting a baseband signal and the radio signal into each other.

The memories 102 and 202 may include a read-only memory (ROM), a random access memory (RAM), a flash memory, a memory card, a storage medium, and/or other storage devices.

Figure 12:
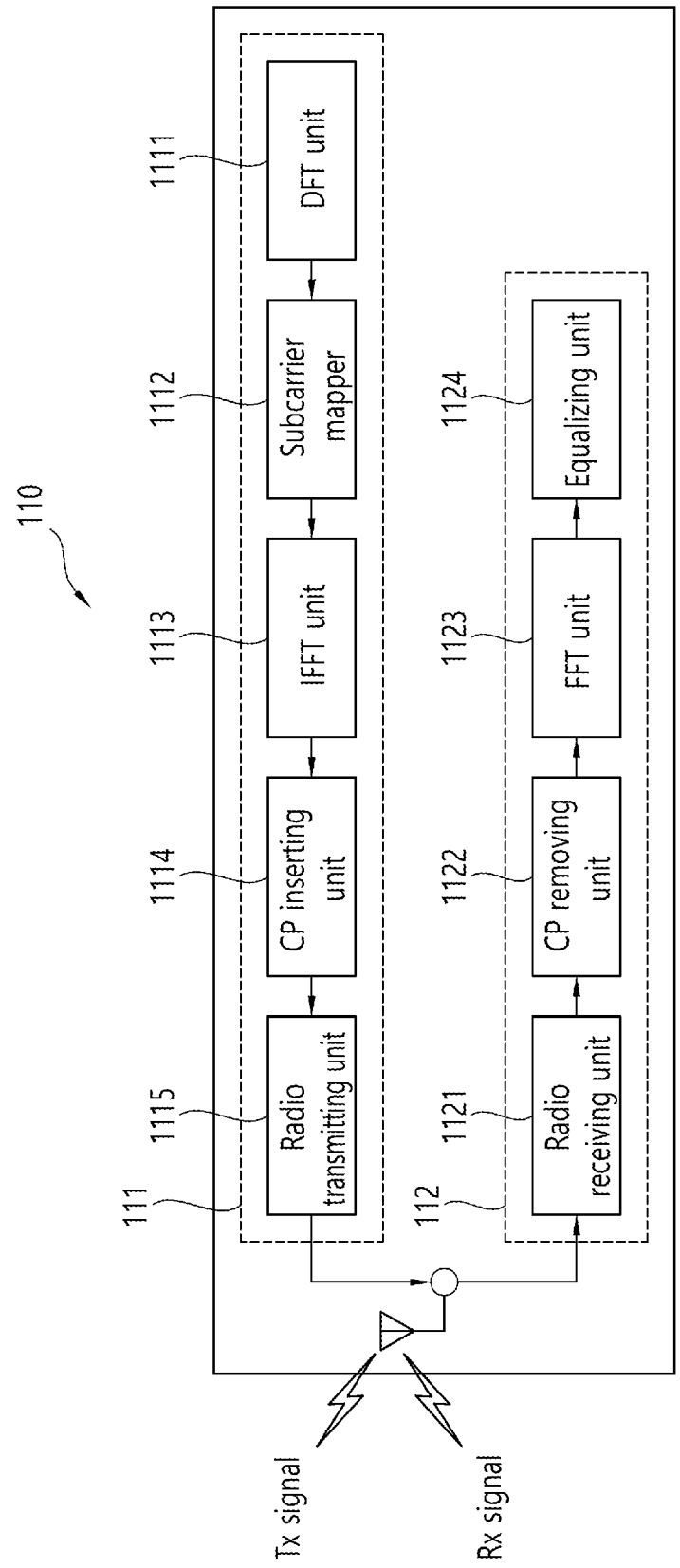
FIG. 12 is a detailed block diagram of the transceiver of the wireless device illustrated in FIG. 11.

FIG. 12 is a Detailed Block Diagram of the Transceiver of the Wireless Device Illustrated in FIG. 11.

Referring to FIG. 12, the transceiver 110 includes a transmitter 111 and a receiver 112. The transmitter 111 includes a discrete Fourier transform (DFT) unit 1111, a subcarrier mapper 1112, an IFFT unit 1113, a CP inserting unit 11144, and a wireless transmitter 1115. The transmitter 111 may further include a modulator. Further, the transceiver 110 may further include a scramble unit, a modulation mapper (not shown), a layer mapper, and a layer permutator, which may be arranged before the DFT unit 1111. That is, in order to prevent an increase in peak-to-average power ratio (PAPR), the transmitter 111 first passes information through the DFT 1111 before mapping a signal to a subcarrier. A signal spread (or precoded in the same sense) by the DFT unit 1111 is subcarrier-mapped through the subcarrier mapper 1112 and then made to a signal on a time axis through the inverse fast Fourier transform (IFFT) unit 1113.

The DFT unit 1111 performs DFT on the input symbols to output complex-valued symbols. For example, when Ntx symbols are input (however, Ntx is a natural number), the DFT size is Ntx. The DFT unit 1111 may be referred to as a transform precoder. The subcarrier mapper 1112 maps the complex-valued symbols to subcarriers in the frequency domain. The complex-valued symbols may be mapped to resource elements corresponding to resource blocks allocated for data transmission. The subcarrier mapper 1112 may be referred to as a resource element mapper. The IFFT unit 1113 performs IFFT on the input symbol and outputs a baseband signal for data, which is a time domain signal. The CP inserting unit 1114 copies a part of the rear part of the base band signal for data and inserts the copied rear part to the front part of the base band signal for data. Inter-symbol interference (ISI) and inter-carrier interference (ICI) are prevented through CP insertion, and orthogonality may be maintained in a multi-path channel.

On the other hand, the receiver 112 includes a wireless receiving unit 1121, a CP removing unit 1122, an FFT unit 1123, and an equalizing unit 1124. The wireless receiving unit 1121, the CP removing unit 1122 and the FFT unit 1123 of the receiver 112 perform a reverse function of the wireless receiving unit 1115, the CP removing unit 1114 and the FFT unit 1113 of the transmitter 111. The receiver 112 may further include a demodulator.

What is claimed is:

1. A method performed by a user equipment (UE) in a new radio (NR) system, the method comprising:

receiving, from a NR cell of a base station, a synchronization signal block (SSB) at a frequency position; and performing an initial access procedure for the NR cell of the base station based on the received SSB, wherein the frequency position of the SSB received from the NR cell exists in a NR band which is re-farmed from a long term evolution (LTE), wherein the NR band uses a channel raster of 100 kHz and the SSB uses a subcarrier spacing of 15 kHz, wherein the frequency position of the SSB is one of (i) a first plurality of frequency positions that are equally spaced apart by 1.2 MHz, (ii) a second plurality of frequency positions that are equally spaced apart by 1.2 MHz, or (iii) a third plurality of frequency positions that are equally spaced apart by 1.2 MHz, and wherein the second plurality of frequency positions is shifted by 100 kHz relative to the first plurality of frequency positions, the third plurality of frequency positions is shifted by 100 kHz relative to the second plurality of frequency positions, and the third plurality of frequency positions is shifted by 200 kHz relative to the first plurality of frequency positions.

2. The method of claim 1, wherein the SSB is not located in a center frequency of a cell.

3. The method of claim 1, wherein each of the first plurality of frequency positions, the second plurality of frequency positions, and the third plurality of frequency positions is defined by a respective synchronization raster.

4. The method of claim 3, wherein for each of the first plurality of frequency positions, the second plurality of frequency positions, and the third plurality of frequency positions, the respective synchronization raster is different from the channel raster.

5. The method of claim 1, wherein the SSB comprises a primary synchronization signal (PSS), a secondary synchronization signal (SSS), and a physical broadcast channel (PBCH).

6. A user equipment (UE) configured to operate in a new radio (NR) system, the UE comprising:
   a transceiver;
   at least one processor; and
   at least one computer memory operably connectable to the at least one processor and storing instructions that, when executed by the at least one processor, perform operations comprising:
   receiving, from a NR cell of a base station, a synchronization signal block (SSB) at a frequency position; and
   performing an initial access procedure for the NR cell of the base station based on the received SSB,
   wherein the frequency position of the SSB received from the NR cell exists in a NR band which is re-farmed from a long term evolution (LTE),
   wherein the NR band uses a channel raster of 100 kHz and the SSB uses a subcarrier spacing of 15 kHz,
   wherein the frequency position of the SSB is one of (i) a first plurality of frequency positions that are equally spaced apart by 1.2 MHz, (ii) a second plurality of frequency positions that are equally spaced apart by 1.2 MHz, or (iii) a third plurality of frequency positions that are equally spaced apart by 1.2 MHz, and
   wherein the second plurality of frequency positions is shifted by 100 kHz relative to the first plurality of frequency positions, the third plurality of frequency positions is shifted by 100 kHz relative to the second plurality of frequency positions, and the third plurality of frequency positions is shifted by 200 kHz relative to the first plurality of frequency positions.

7. The UE of claim 6, wherein the SSB is not located in a center frequency of a cell.

8. The UE of claim 6, wherein each of the first plurality of frequency positions, the second plurality of frequency positions, and the third plurality of frequency positions is defined by a respective synchronization raster.

9. The UE of claim 8, wherein for each of the first plurality of frequency positions, the second plurality of frequency positions, and the third plurality of frequency positions, the respective synchronization raster is different from the channel raster.

10. The UE of claim 6, wherein the SSB comprises a primary synchronization signal (PSS), a secondary synchronization signal (SSS), and a physical broadcast channel (PBCH).

11. A processing device configured to control a user equipment (UE) to operate in a new radio (NR) system, the processing device comprising:
   at least one processor; and
   at least one computer memory operably connectable to the at least one processor and storing instructions that, when executed by the at least one processor, perform operations comprising:
   receiving, from a NR cell of a base station, a synchronization signal block (SSB) at a frequency position; and
   performing an initial access procedure for the NR cell of the base station based on the received SSB,
   wherein the frequency position of the SSB received from the NR cell exists in a NR band which is re-farmed from a long term evolution (LTE),
   wherein the NR band uses a channel raster of 100 kHz and the SSB uses a subcarrier spacing of 15 kHz,
   wherein the frequency position of the SSB is one of (i) a first plurality of frequency positions that are equally spaced apart by 1.2 MHz, (ii) a second plurality of frequency positions that are equally spaced apart by 1.2 MHz, or (iii) a third plurality of frequency positions that are equally spaced apart by 1.2 MHz, and
   wherein the second plurality of frequency positions is shifted by 100 kHz relative to the first plurality of frequency positions, the third plurality of frequency positions is shifted by 100 kHz relative to the second plurality of frequency positions, and the third plurality of frequency positions is shifted by 200 kHz relative to the first plurality of frequency positions.

12. The processing device of claim 11, wherein the SSB is not located in a center frequency of a cell.

13. The processing device of claim 11, wherein each of the first plurality of frequency positions, the second plurality of frequency positions, and the third plurality of frequency positions is defined by a respective synchronization raster.

14. The processing device of claim 13, wherein for each of the first plurality of frequency positions, the second plurality of frequency positions, and the third plurality of frequency positions, the respective synchronization raster is different from the channel raster.

15. The processing device of claim 11, wherein the SSB comprises a primary synchronization signal (PSS), a secondary synchronization signal (SSS), and a physical broadcast channel (PBCH).

* * * * *